United States Patent
Palm et al.

(10) Patent No.: US 11,633,713 B2
(45) Date of Patent: *Apr. 25, 2023

(54) ULTRA-HIGH PERFORMANCE AND HIGH PURIFY BIOGENIC SILICA FILTRATION MEDIA

(71) Applicant: EP MINERALS, LLC, Reno, NV (US)

(72) Inventors: Scott Kevin Palm, Reno, NV (US); George A. Nyamekye, Sparks, NV (US)

(73) Assignee: EP Minerals, LLC, Reno, NV (US)

( * ) Notice: Subject to any disclaimer, the term of this patent is extended or adjusted under 35 U.S.C. 154(b) by 741 days.

This patent is subject to a terminal disclaimer.

(21) Appl. No.: 16/476,215

(22) PCT Filed: Jan. 6, 2017

(86) PCT No.: PCT/US2017/012565
§ 371 (c)(1),
(2) Date: Jul. 5, 2019

(87) PCT Pub. No.: WO2018/128622
PCT Pub. Date: Jul. 12, 2018

(65) Prior Publication Data
US 2020/0001267 A1    Jan. 2, 2020

(51) Int. Cl.
*B01J 20/14* (2006.01)
*B01D 39/20* (2006.01)
(Continued)

(52) U.S. Cl.
CPC .............. *B01J 20/14* (2013.01); *B01D 39/20* (2013.01); *B01J 20/28011* (2013.01);
(Continued)

(58) Field of Classification Search
CPC .. B01J 20/14; B01J 20/28011; B01J 20/3071; B01J 20/3078; B01D 2239/1258;
(Continued)

(56) References Cited

U.S. PATENT DOCUMENTS 3,702,886 A    11/1972    Argauer et al.
4,367,215 A    1/1983    Gjelsvik et al.
(Continued)

FOREIGN PATENT DOCUMENTS

CN    102327745 A    1/2012
WO    2012049527 A2    4/2012
(Continued)

OTHER PUBLICATIONS

CNIPA, Office Action issued in CN App. No. 2017800881612, dated Dec. 16, 2021.
(Continued)

*Primary Examiner* — Smita S Patel
(74) *Attorney, Agent, or Firm* — The Webb Law Firm

(57) ABSTRACT

This disclosure relates to ultra-high performance diatomite products possessing very high silica specific volume, a characteristic which provides for high filtration performance, in terms of low unit consumption and long filtration cycle times. These novel products of this disclosure also show very low extractable metals for both the non-acid washed and the high purity (acid washed) grades. These characteristics are of particular value in the separation of solids from high purity liquids in electronic chemical, specialty beverage and life science applications. In addition to outstanding physical and chemical characteristics, these products also contain no detectable levels of cristobalite and have a wide range of permeabilities, and are produced from mineralogically impure ores containing high levels of alumina and iron oxide.

16 Claims, 8 Drawing Sheets

(51) Int. Cl.
*B01J 20/28* (2006.01)
*B01J 20/30* (2006.01)

(52) U.S. Cl.
CPC ....... *B01J 20/3071* (2013.01); *B01J 20/3078* (2013.01); *B01D 2239/1258* (2013.01)

(58) Field of Classification Search
CPC ...................... B01D 2239/1291; B01D 39/20; B01D 39/00; B01D 39/06
See application file for complete search history.

(56) References Cited

U.S. PATENT DOCUMENTS

| | | | |
|---|---|---|---|
| 5,235,075 | A | 8/1993 | Bachman et al. |
| 5,179,062 | A | 12/1993 | Dufour |
| 5,656,568 | A | 8/1997 | Shiuh et al. |
| 7,122,080 | B2 | 10/2006 | Pruett et al. |
| 8,410,017 | B2 | 4/2013 | Nyamekye et al. |
| 10,913,049 | B2 * | 2/2021 | Fleming .................. C04B 28/26 |
| 11,243,177 | B2 * | 2/2022 | Lenz ..................... G01N 23/207 |
| 2004/0173057 | A1 | 9/2004 | Fairbourn |
| 2010/0248953 | A1 | 9/2010 | Nyamekye et al. |
| 2014/0000487 | A1 | 1/2014 | Wang |
| 2014/0369904 | A1 | 12/2014 | Boudreault et al. |
| 2016/0332135 | A1 | 11/2016 | Taniguchi |

FOREIGN PATENT DOCUMENTS

| | | |
|---|---|---|
| WO | 2015088800 A1 | 6/2015 |
| WO | 2016032745 A1 | 3/2016 |

OTHER PUBLICATIONS

Aguilar-Mamani, W. et al. "Comparison Between Leached Metakaolin And Leached Diatomaceous Earth As Raw Materials For The Synthesis of ZSM-5," SpringerPlus 2014, 3:292. Retrieved from Internet: <URL: http://www.pringerplus.com/content/3/1/292>.

Plafker, G. "Occurrence Of Diatomaceous Earth Near Kenai, Alaska," Geological Survey Bulletin 1039-B, United States Government Printing Office, Washington: 1956.

Plafker, Occurrence of Diatomaceous Earth Near Kenai, Alaska, Geological Survey Bulletin 1039-B, 1956.

* cited by examiner

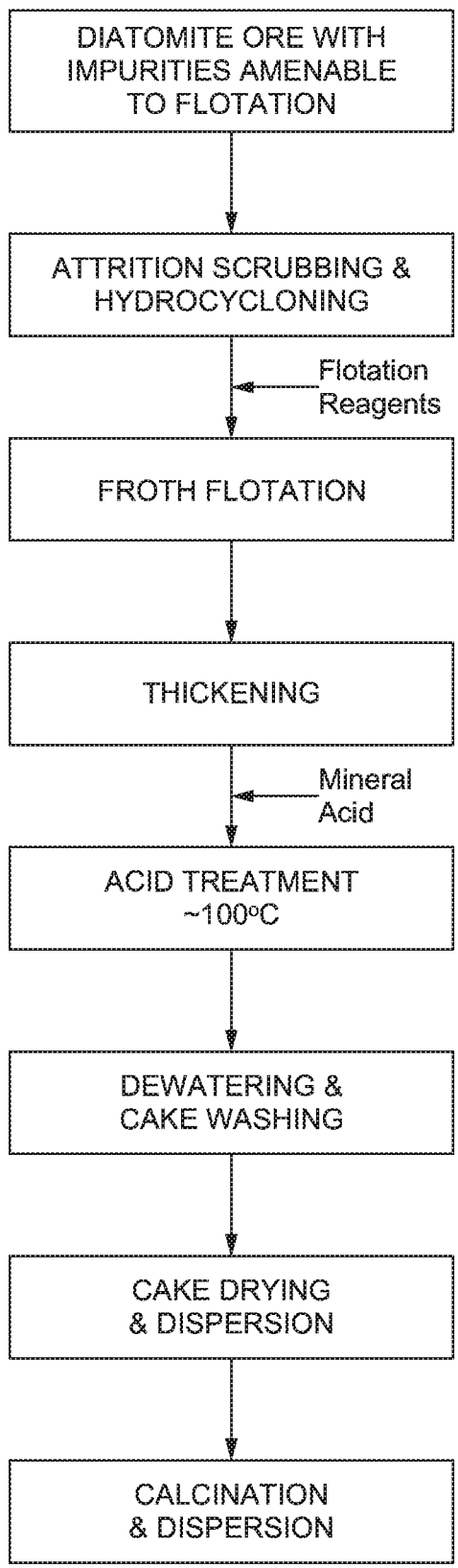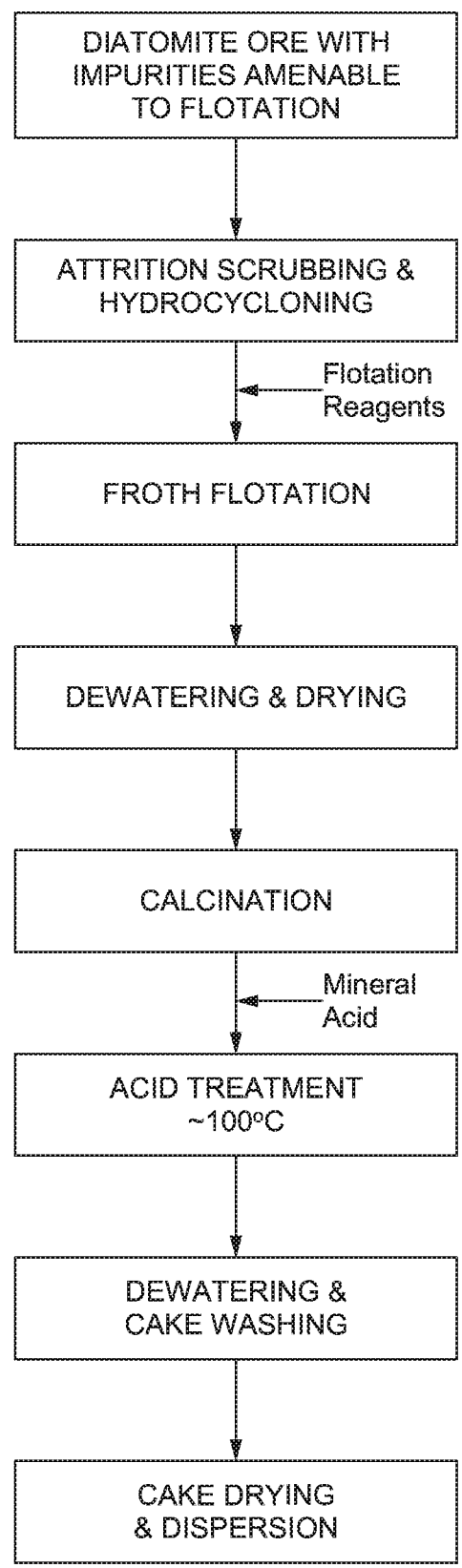
FIG. 3A
FIG. 3B

ULTRA-HIGH PERFORMANCE AND HIGH PURIFY BIOGENIC SILICA FILTRATION MEDIA

FIELD OF THE INVENTION

This disclosure relates to ultra-high performance diatomite products possessing very high silica specific volume, a characteristic which provides for high filtration performance in terms of low unit consumption and long filtration cycle times. The novel products of this disclosure show very low extractable metals for both the non-acid washed and high purity (acid washed) grades. These characteristics are of particular value in the separation of solids from liquids in many food, beverage and chemical applications and, for the higher purity versions of the product, from high purity liquids in electronic chemical, specialty beverage and life science applications. In addition, these products also contain no detectable levels of cristobalite, a form of crystalline silica, and have a wide range of permeabilities. These products are produced from mineralogically impure ores containing high levels of alumina and iron oxide

BACKGROUND

Diatomite (sometimes called diatomaceous earth or kieselguhr) is a sedimentary rock that comprises the remnant skeletons of diatoms, single-celled plants that inhabit the surface of many stationery bodies of water, and other minerals, such as clays, volcanic ash, calcite, dolomite, feldspars and silica sand, that are deposited through the forces of air and water. Diatomite deposits may also contain organic contaminants, which may also be associated with sulfur and arsenic.

Hundreds of different species of diatoms, which are characterized by unique frustule shapes, have been identified as living organisms through the frustules contained in deposits of diatomaceous earth.

Commercial diatomite deposits typically contain in the range of 80-90 wt % $SiO_2$, alumina (0.6-8 wt % $Al_2O_3$), iron (0.2-3.5 wt % $Fe_2O_3$), alkali metal oxides, $Na_2O$ and MgO (less than 1 wt %), CaO (0.3-3 wt %) and minor amounts of other impurities, such as $P_2O_5$ and $TiO_2$ (Mahani, H. et al., 2003, Breese, R. O. Y. et al., 2006). The fine intricate and porous nature of the diatoms skeletal structure provides for lower density, high surface area and permeability that helps distinguish diatomite from other forms of silicate minerals. The pore structure of diatomaceous earth comprises macropores, mesopores and micropores, which provide for wetting and high absorptive capacity necessary in certain formulations involving the use of diatomite products/media (Mikulasik, et al., U.S. Pat. No. 8,883,860).

The combination of chemical inertness of the silica and the accompanying intricate and porous structure of diatom frustules give diatomite products/media unique commercial value in filtration applications. Diatomite filtration products/media have been used for many years in liquid/solid separation in the food, beverage and chemicals industries. As used herein the term "media" means one or more medium. Conventional diatomite products/media are used in the processing of wide range of fluids, including beverages, petroleum products and derivatives, water), chemicals, ingestible pharmaceuticals, metals rolling mill cooling liquids, agro-food intermediates and sweeteners (El-Shafey, E. L. et al. 2004).

Diatomite may be used in a filtration process as a pre-coat or as a bodyfeed or a combination of the two, depending on the nature of the material to be filtered and the type of filter employed. In a precoat-only system, a layer of filter aid is built up on the filter septum to protect against the blinding of particulate of the media by recirculating a filter aid slurry. In a bodyfeed-only system, small amounts of filter aid are regularly added to the liquid to be filtered together with the suspended particulates to be removed. This ensures that a new filtering surface is continuously formed that helps to entrap the suspended particulates and at the same time ensure a constant flow rate of the liquid. Large volumes of filtration media are used in the form of precoat-only in rotary vacuum filtration, and large volumes are also used in both precoating and bodyfeed in pressure filtration systems. Some specialty pressure filtration applications, such as sake filtration use a precoat-only approach. (See for the fundamentals of diatomite filtration: Breese, R. O. Y. et al, 2006, Reese, R. H. et al, 1990, Cain, C. W., 1984).

In both the precoat and body feed filtration applications the diatomite filter aid product or media contacts the fluid being filtered. One of the potential drawbacks in the use of diatomaceous filtration media as a filter aid is the contribution of metal extractables from the filter aid to the fluid. Increased levels of soluble metals in these applications can affect the purity of the liquid product, as well as the stability and taste of the product. Therefore, conventional filter aid products, when used in food and beverage processing, are required to meet government requirements for purity, such as the US Food Chemicals Codex, as well as specification set by the producers of the liquid products.

While many applications for powdered filtration media, such as diatomite, are sensitive to the extractable chemistry of the media, certain liquid processing applications are highly sensitive to extractable impurities. For example, parenteral (injectable) pharmaceuticals, high purity chemicals and some specialty beverages often cannot tolerate the level of extractable impurities that are characteristic of conventional, food-grade diatomite products/media. As a result, in these applications, diatomite filtration media, which contribute reduced levels of impurities to the liquids being filtered are preferred and are used in these applications. While some purified diatomite filtration media products have been developed and are used in these applications, the applications for, and need for, ever higher purity liquids, continue to grow, and there is a need for diatomite filtration product/media with improved purity.

The low extractable, ultra-high performance filtration products/media of the present disclosure possess unique combinations of very low extractable impurities per unit mass, very low centrifuged wet densities and very high flux rates relative to density. The biogenic filtration media also provide for significantly reduced unit consumption, in terms of mass consumed per unit of liquid filtered. The combination of very low extractable impurities per unit mass and significantly-reduced consumption of mass per unit of liquid filtered provide a compounding effect in the delivery of liquid purity, and represents a substantial improvement, relative to the prior art, in the capability of diatomite filtration media to improve the purity of liquids during liquid filtration.

Conventional Diatomite Filtration Media

Conventional diatomite filter aids are inorganic powders possessing the intricate and porous structure of diatom frustules. Several of the leading manufacturers of commercial diatomite filter aid products are Imerys Filtration Minerals, EP Minerals, Showa Chemical Industries, Grefco Minerals and Calgon Carbon (CECA). Diatomite products are produced to meet certain permeabilities, measured in Darcy unit, which is a measure of the flow of liquid through a standard amount of filter cake under standard conditions. Three broad descriptive terms for the type of diatomite filter aids, based on the manufacturing techniques employed, are commonly used and include: natural (non-calcined), straight-calcined (calcined without the addition of a flux) and flux-calcined (calcined in the presence of a flux, such as soda ash). Table 1 lists selected chemical and physical properties, including the centrifuged wet density (CWD) and the silica specific volume (SSV), of a range of exemplary conventional natural, straight-calcined and flux-calcined diatomite products/media from four of the major global diatomite producers, EP Minerals LLC, Showa Chemical Company, Imerys Filtration Minerals and Calgon Carbon (CECA). Silica specific volume is a ratio of the silica content to the centrifuged wet density.

TABLE 1

Typical Physical and Chemical Properties of Exemplary Conventional Commercial Diatomite Filter Aids

| Category | Perm (Darcy) | CWD (g/ml) | $SiO_2$ (wt %) | $Al_2O_3$ (wt %) | $Fe_2O_3$ (wt %) | SSV |
|---|---|---|---|---|---|---|
| Natural | | | | | | |
| Celite FilterCel[1] | 0.07 | 0.289 | 89.0 | 3.3 | 1.4 | 3.1 |
| CelaBrew-1[2] | 0.09 | 0.401 | 92.6 | 3.8 | 1.6 | 2.3 |
| Celatom FN-2[2] | 0.06 | 0.340 | 89.2 | 4.0 | 1.5 | 2.6 |
| Celite S[1] | 0.04 | 0.244 | 91.1 | 5.4 | 1.8 | 3.7 |
| Straight Calcined | | | | | | |
| Standard SuperCel[1] | 0.3 | 0.305 | 91.1 | 4.0 | 1.3 | 3.0 |
| Celite 3Z[1] | 0.5 | 0.305 | 92.0 | 3.3 | 1.3 | 3.0 |
| Celatom FP-3[2] | 0.2 | 0.369 | 92.6 | 3.8 | 1.6 | 2.5 |
| Celatom FP-6[2] | 0.5 | 0.353 | 92.6 | 3.8 | 1.6 | 2.6 |
| Radiolite 300[3] | 0.2 | 0.380 | 92.0 | 4.2 | 1.7 | 2.4 |
| CECA Clarcel cbr3[4] | 0.3 | 0.400 | 88.6 | 4.3 | 2.7 | 2.2 |
| Flux Calcined | | | | | | |
| Celatom FW-12[2] | 1.0 | 0.320 | 89.0 | 4.1 | 1.5 | 2.8 |
| Celatom FW-60[2] | 5.0 | 0.304 | 89.0 | 4.1 | 1.5 | 2.9 |
| Hyflo SuperCel[1] | 1.4 | 0.320 | 91.5 | 1.0 | 1.5 | 2.9 |
| Celite 545[1] | 4.2 | 0.336 | 91.5 | 1.0 | 1.5 | 2.7 |
| Radiolite 600[3] | 1.2 | 0.360 | 90.4 | 3.1 | 1.7 | 2.5 |
| Radiolite 900S[3] | 5.0 | 0.330 | 90.5 | 3.3 | 1.7 | 2.7 |
| CECA Clarcel DIC/B[4] | 1.4 | 0.410 | 86.8 | 3.4 | 2.3 | 2.1 |

[1]Celite Corporation technical data sheet
[2]EP Minerals technical data sheet
[3]Showa Chemicals Industry technical data sheet
[4]CECA technical data sheet; (product now produced by Calgon Carbon)

The silica content of all these product categories (natural, straight-calcined, flux-calcined) of the exemplary conventional diatomite filtration media averages around 90.0 wt % $SiO_2$, alumina is in the range of 1.0 wt % to 5.4 wt % $Al_2O_3$ while iron oxide is 1.3 wt % to 1.8 wt % $Fe_2O_3$, with the exception of CECA products (now produced by Calgon Carbon) that show much high iron oxide chemistry. In general, the centrifuged wet density of the products is 0.29 g/ml (18.0 lb/ft$^3$) to 0.40 g/ml (25.0 lb/ft$^3$) and the silica specific volume ranges from 2.1 to 3.1 with the exception of Celite S, a natural product which has a silica specific volume of 3.7.

In conventional diatomite filter aid manufacturing, the typical centrifuged wet density of the natural ore used as calcination feed is between 0.272 g/ml (17.0 lb/ft$^3$) and 0.417 g/ml (26.0 lb/ft$^3$) and the final product after calcination and classification may often have a higher centrifuged wet density than the initial feed material, mainly due to degradation of the product in the dry end classification process. The typical chemical and physical properties of exemplary commercial grade natural diatomites serving as calcination feed are shown in Table 2 below.

TABLE 2

Typical Chemical and Physical Properties of Natural Diatomite Ores

| | EP Minerals[1], Lovelock, NV | EP Minerals[2], Vale, OR | Imerys Minerals[3], Lompoc, CA | Showa[4] Chemicals |
|---|---|---|---|---|
| Silica ($SiO_2$) wt % | 89.8 | 92.6 | 87.1 | 91.9 |
| Alumina ($Al_2O_3$) wt % | 3.1 | 3.8 | 3.6 | 4.1 |
| Iron Oxide ($Fe_2O_3$) wt % | 1.3 | 1.6 | 1.2 | 1.9 |
| Lime (CaO) wt % | 0.4 | 0.6 | 0.7 | 0.4 |
| Soda ($Na_2O$) wt % | 0.2 | 0.4 | 0.3 | 0.4 |
| Others wt % | 5.2 | 1.0 | 4.9 | 1.3 |
| CWD (g/ml) | 0.32 | 0.37 | 0.28 | 0.40 |
| SSV | 2.8 | 2.5 | 3.1 | 2.3 |

[1]Industrial Minerals and Rocks
[2]EP Minerals Technical Data Sheet
[3]Celite Technical Data Sheet
[4]Showa Chemical Industry Technical Data Sheet Conventional diatomite filtration media products are generally produced using dry processes involving, (1) crushing the run-of-mine diatomite ore, (2) simultaneous milling and flash drying of the crushed ore to effect de-agglomeration of the lumpy particles, (3) removing heavy mineral impurities (from the milled and dried ore of (2)) with the aid of a separator, (4) thermally sintering or calcining the beneficiated ore (the beneficiation process involving steps 1-3 above) in a rotary kiln, optionally in the presence of a fluxing agent, to significantly increase the permeability of the product, (5) subjecting the kiln discharge product to a secondary waste separation to remove heavy particles, including glass, that were generated during the thermal sintering process, and (6) classifying the powder into various size fractions to conform to the particle size distribution and permeability of the target products (Industrial Minerals and Rocks, 7th Edition, Diatomite, p. 442). Natural diatomaceous earth filtration media products are not subjected to any form of calcination but are packaged after the waste separation process. As is known to those of ordinary skill in the art, the term "run-of-mine" means ore in its natural, unprocessed state. The typical, conventional diatomite filter aid manufacturing process flow diagram is shown in FIG. 1.

Cristobalite-Free Diatomite Products

In diatomite calcination, the typical feed ore chemistry shows aluminum oxide content of about 2-4 wt % and iron oxide content of about 1-2 wt %. During the calcination process the opaline structure of the diatomite undergo changes to form cristobalite in the presence of a fluxing agent (flux-calcination), for example soda ash, or even in the absence any fluxing agent (straight-calcination) under higher processing temperatures. International Application Nos. PCT/US16/37830, PCT/US16/37816 and PCT/US16/37826 (individually and collectively, "Lenz et al.") introduced straight-calcined and flux-calcined diatomite products/media having low or non-detectable levels of cristobalite based on selected ores of unusual chemical composition. With these selected ores, it was shown that opal-C (and/or opal-CT) forms when straight-calcined or flux-calcined at high temperatures, and not cristobalite. The test method used by Lenz et al. in International Application Nos. PCT/US16/37830, PCT/US16/37816 and PCT/US16/

37826 in determining the crystalline phase of the products is the LH Method as described under the "Methods of Characterizing the Ultra-high Performance Diatomite Filtration Products/Media and the High Purity, Ultra-high Performance Diatomite Filtration Products/Media" section of this disclosure. Table 3A and 3B below show the properties of exemplary diatomite products/media that have been identified as cristobalite-free products using the LH Method (but not when traditional test methods for the determination of the cristobalite content of diatomite products are used).

than conventional diatomite products but filtration performance that is roughly similar to the filtration performance of conventional diatomite filtration media. Beginning in the late 1950's, the diatomite industry began to experiment with and introduce products which had been processed in wet processes with the intention of reducing the extractable impurities contained in the product (Bregar, G. W. 1951). These products, which were produced originally in the United States in Manville, N.J., and later in larger volumes in Japan, were composed of conventional diatomite filtration

TABLE 3A

Cristobalite-Free Calcined Diatomite Products/Media identified using the LH Method

| | Product | | | | | | |
|---|---|---|---|---|---|---|---|
| | Celite SSC | Celite 512 | Celite 577 | Radio-lite 200 | Radio-lite 300 | Celatom FP-4 | Celatom FW-6 |
| Product Category | Straight-calcined | Straight-calcined | Straight-calcined | Straight-calcined | Straight-calcined | Straight-calcined | Straight-calcined |
| Permeability (darcy) | 0.23 | 0.50 | 0.16 | 0.12 | 0.23 | 0.30 | 0.50 |
| CWD (g/ml) | 0.33 | 0.30 | 0.30 | 0.44 | 0.43 | 0.37 | 0.37 |
| $SiO_2$ (wt %) | 91.1 | 91.5 | 91.5 | 92.1 | 92.0 | 92.6 | 92.6 |
| $Al_2O_3$ (wt %) | 4.0 | 4.0 | 4.0 | 4.0 | 4.2 | 3.8 | 3.8 |
| $Fe_2O_3$ (wt %) | 1.3 | 1.1 | 1.1 | 1.8 | 1.7 | 1.6 | 1.6 |
| SSV | 2.8 | 3.1 | 3.1 | 2.1 | 2.1 | 2.5 | 2.5 |
| EMF[1] (ppm) | 313 | 377 | 303 | 283 | 139 | 366 | 388 |
| Quartz (wt %) | 3.5 | 3.1 | 1.9 | 2.1 | 3.5 | 0.0 | 0.0 |
| Cristobalite (wt %) | 0.0 | 0.0 | 0.0 | 0.0 | 0.0 | 0.0 | 0.0 |

[1]extractible metals factor (EMF)

TABLE 3B

Cristobalite-Free Flux-calcined Diatomite Products by Lenz et al. using LH Method

| | Sample | | | | |
|---|---|---|---|---|---|
| | 18184-3 | 18188-2 | 18188-4 | 18188-7 | 18188-9 |
| | Product Category | | | | |
| | Flux-calcined | Flux-calcined | Flux-calcined | Flux-calcined | Flux-calcined |
| $SiO_2$ (wt %) | 88.7 | 87.3 | 87.8 | 87.7 | 86.4 |
| $Al_2O_3$ (wt %) | 5.6 | 6.9 | 6.5 | 5.4 | 5.3 |
| $Fe_2O_3$ (wt %) | 2.8 | 2.7 | 2.8 | 2.8 | 2.8 |
| Permeability (darcy) | 1.27 | 1.16 | 1.66 | 4.43 | 8.91 |
| CWD (g/ml) | 0.28 | 0.29 | 0.28 | 0.28 | 0.26 |
| SSV | 3.2 | 3.0 | 3.1 | 3.1 | 3.3 |
| EMF (ppm) | 154 | 245 | 120 | 97 | 107 |
| Cristobalite (wt %) | 0.0 | 0.0 | 0.0 | 0.0 | 0.0 |
| Quartz (wt %) | 0.0 | 0.0 | 0.0 | 0.0 | 0.0 |

With the exception of the Celatom straight-calcined products, all other straight-calcined products in Table 3A contain quartz, a form of crystalline silica. In Table 3B, data from Lenz et al. show flux-calcined products which are cristobalite-free and quartz free, making them crystalline silica free with permeabilities up to about 9000 millidarcies. It can be observed that all these products show high alumina and iron oxide chemistry that may inhibit the formation of cristobalite in the calcination process. The centrifuged wet density (CWD), silica specific volume (SSV) and extractible metals factor (EMF) of these products are typical for conventional diatomite filter aids.

High Purity Diatomite Filtration Products

For the purposes of this disclosure, we define high purity diatomite filtration media as products that have been acid washed to provide substantially lower extractable impurities products subsequently treated through acid washing and rinsing processes. In these traditional methods of producing high purity diatomite products, the products were acid washed under atmospheric pressure following the thermal processing of the diatomite. Traditional acid washing processes are effective in reducing the extractable impurities contained at the surface of the diatomite, but, because they did not remove the mineral impurities in the diatomite, it was possible for the extractable impurities to increase when the surface of the product was abraded or broken during conveyance or through normal application handling. In addition, acid washing of the conventionally straight-calcined or flux-calcined products resulted in particle attrition and generation of fines during processing with the consequence of producing lower permeability and higher density material than the conventional products prior to acid washing, which in turn reduced the filtration performance of the products.

A number of companies developed and introduced conventionally acid washed products over the years, including Manville (now Imerys Filtration Minerals) (Johns Manville, 1980; Johns Manville Corp, 1979—Bradley, T. G., et al. (1979)); EP Minerals in the USA and Tsuchida Foods in Japan. Manville also introduced an intensively leached and rinsed product called, Celite Analytical Filter Aid (CAFA), which had low extractables, but conventional or high density. Others have also developed processes for the reduction of soluble iron in diatomite filter aids by treating the diatomite particulates with chelating agents (Austin, F. G. et al. in U.S. Pat. No. 4,965,084); Ting, P. L., US Publication No. 2011/0223301). Smith et al. in International Publication WO2008/024952 provided a method of reducing beer soluble iron in diatomite by steam treatment.

These high purity filtration products possess lower extractable chemistry than conventional diatomite filtration media products, but they usually have either similar, or, sometimes, inferior filtration properties, such as low silica specific volume, due to the increase in centrifuged wet density of the product during the acid washing process. Typical properties of Celite acid washed filter aids and EP Minerals' PurifiDE® acid washed filter aids, a high purity diatomite filtration media/products, are shown in Table 4.

TABLE 4

Typical Physical and Chemical Properties of Commercial High Purity Diatomite Filter Aids

| Product | Perm[1] (Darcy) | CWD[2] (g/ml) | $SiO_2$ (wt %) | Cond.[3] (μS/cm) | SSV[4] |
|---|---|---|---|---|---|
| AW Celite FilterCel | 0.1 | 0.330 | 90.0 | ≤20 | 2.7 |
| AW Celite SSC | 0.3 | 0.330 | 92.6 | ≤20 | 2.8 |
| AW Celite 512 | 0.4 | 0.330 | 92.6 | ≤20 | 2.8 |
| AW Celite Hyflo SC | 1.0 | 0.330 | 89.4 | ≤20 | 2.7 |
| AW Celite 503 | 1.6 | 0.330 | 92.5 | ≤20 | 2.8 |
| AW Celite 535 | 3.0 | 0.330 | 92.5 | ≤20 | 2.8 |
| AW Celite 545 | 4.0 | 0.330 | 92.5 | ≤20 | 2.8 |
| PurifiDE AW3 | 0.3 | 0.370 | 93.6 | ≤20 | 2.5 |
| PurifiDE AW12 | 1.2 | 0.337 | 90.0 | ≤20 | 2.7 |
| PurifiDE AW20 | 2.0 | 0.320 | 91.5 | ≤20 | 2.9 |
| CAFA[5] | 0.3 | 0.290 | 97.5 | ≤20 | 3.4 |

[1]Permeability
[2]Centrifuged Wet Density
[3]Conductivity of 10 wt % slurry
[4]Silica Specific Volume
[5]Celite Analytical Filter Aid As indicated in Table 4, the conductivity of a 10 wt % slurry of the diatomite product is one of the properties that differentiates the high purity acid washed filter aid products from the conventional products. High purity acid washed filter aids have maximum conductivity in the range of 15-20 μS/cm versus that of the conventional products of 70-200 μS/cm, lower conductivity indicating higher purity. There is a small increase in the silica ($SiO_2$) content of the product during the acid washing purification process but the reduction in value of the centrifuged wet density of the material is significant enough to lower the value of the silica specific volume of the purified product.

The typical process for the production of high purity acid washed filter aids is shown in FIG. 2. The process 10 starts with a conventional (diatomaceous earth) filter aid as feed material (a conventional filter aid is a diatomite filter aid made by following the established method of drying, milling, dry waste separation, calcination, and classification, and optionally packaging). It is a common practice to use a feed material which has a slightly higher permeability than that of the target product since there is typically a loss in permeability after the purification process. If possible, the feed material is selected in block 20 such that the centrifuged wet density is also lower than that of the target product since there is typically an increase in the centrifuged wet density of the final purified product. In block 30, a slurry concentration of 10-15 wt % solids is prepared. In block 40, the slurry is acid treated in a non-metallic tank by adding a mineral acid to provide a slurry acidity of 0.1 M-0.2 M. The most common mineral acid used in the Americas is sulfuric acid but it is not uncommon to see hydrochloric acid usage in Japan. Citric acid is also in some few cases to chelate metal ions to make them insoluble. In block 40, the slurry is heated to close to boiling for about an hour. In block 50, the hot acid slurry is dewatered and washed to obtain a filter cake which provides a conductivity of 20 μS/cm or lower for a 10 wt % slurry. In block 60, the final product is dried using a flash dryer or tray dryer.

High Purity, High Performance Products

For the purpose of this disclosure, high purity, high performance products are diatomite filtration media products that have undergone substantial reduction in extractable metals and bulk chemical impurities with a subsequent increase in the silica specific volume and the accompanying improvement in the filtration performance. U.S. Pat. Nos. 5,656,568 and 6,653,255 (collectively, "Shiuh, et al.") provided a thorough review of the prior art and disclose improved purified diatomite products and introduced the concepts of high purity, high performance filtration media and a new measure for characterizing diatomite filtration media, called silica specific volume (SSV), which is a ratio of the silica content to the centrifuged wet density (CWD). Silica specific volume is often a good predictor of the relative filtration performance that one can expect from diatomite filtration media.

Shiuh et al. teach a method of separating the impurities found in conventional diatomite ores through froth flotation prior to the thermal processing of the diatomite. This has the effect of increasing the silica specific volume of the diatomite and improving the purity and the filtration performance of the product. The flotation product is further purified through acid treatment and rinsing at atmospheric pressure prior to thermal treatment of the material by calcination. This process approach improves the silica specific volume but does not significantly improve the extractable properties of the product since metallic ions tend to migrate to the surface of diatomite particles during the calcination process. Flux-calcined products, especially, will show high conductivity and high extractable sodium because the soda ash fluxing agent used in the last process step of calcination will be readily available to be washed out of the surface of the product particles. Shiuh et al. disclosed a number of product properties for high purity, high performance diatomite, which are summarized in Table 4A. The permeability of the products disclosed through the examples in the Shiuh et al. patents (U.S. Pat. Nos. 5,656,568 and 6,653,255) was 300 to 1200 millidarcies, as noted in Table 4A. No permeability was disclosed for the non-calcined product of example 1 in Shiuh et al.

TABLE 4A

Properties of High Purity, High Performance Diatomite Filter Aids (Shiuh et al.)

| Product Category | Permeability (Darcy) | CWD (g/ml) | $SiO_2$ (wt %) | $Al_2O_3$ (wt %) | $Fe_2O_3$ (wt %) | $Na_2O$ (wt %) | SSV |
|---|---|---|---|---|---|---|---|
| Natural (Shiuh et al. example 1) | n/a[1] | 0.27 | 99.1 | 0.3 | 0.2 | — | 3.7 |
| Straight-Calcined (Shiuh et al. example 2) | 0.3 | 0.21 | 99.6 | 0.3 | 0.1 | — | 4.7 |

TABLE 4A-continued

Properties of High Purity, High Performance Diatomite Filter Aids (Shiuh et al.)

| Product Category | Permeability (Darcy) | CWD (g/ml) | SiO$_2$ (wt %) | Al$_2$O$_3$ (wt %) | Fe$_2$O$_3$ (wt %) | Na$_2$O (wt %) | SSV |
|---|---|---|---|---|---|---|---|
| Flux-Calcined (Shiuh et al. example 3) | 1.2 | 0.16 | 96.8 | 0.4 | 0.1 | 1.5 | 6.1 |

[1]not available

Advanced Minerals Corporation, a subsidiary of World Minerals® (now Imerys Filtration and Additives) introduced several high purity, high performance products with the trademark Celpure® which in some cases possess properties that fall within some of the characteristic ranges taught by Shiuh, et al. These products have also been available in the approximate permeability range of 25 millidarcies to 1000 millidarcies. The properties of the products are given in Table 4B below.

The silica contents of the Celpure products are lower than the silica contents of the products taught by Shiuh et al., and the alumina and iron oxide levels of the Celpure products are significantly higher than those of the products taught by Shiuh et al. The Celpure products also, in most cases have equal or lower silica specific volumes than the products taught by Shiuh et al. The ratio of the EBC extractable aluminum to the bulk aluminum oxide chemistry (wt %) is between about 1.4 to about 5.4 and the ratio of the EBC extractable iron to the bulk iron oxide chemistry (wt %) is about 6.3 to about 16.7 for the Celpure products. These ratios indicate the ease of extraction of the impurities into solution, and a lower number indicates a higher purity (more inert) product.

TABLE 4B

Typical Properties of High Purity, High Performance Diatomite Filter Aids - Celpure Products

| Product/Media | Celpure 25 | Celpure 65 | Celpure 100 | Celpure 300 | Celpure 1000 |
|---|---|---|---|---|---|
| Perm (mDarcy) | 25 | 65 | 100 | 300 | 1000 |
| CWD (g/ml) | 0.253 | 0.271 | 0.250 | 0.256 | 0.213 |
| SiO$_2$ (wt %) | 96.61 | 97.51 | 97.94 | 97.65 | 95.94 |
| Al$_2$O$_3$ (wt %) | 1.85 | 1.34 | 1.15 | 1.27 | 1.47 |
| Fe$_2$O$_3$ (wt %) | 0.47 | 0.31 | 0.19 | 0.23 | 0.32 |
| Na$_2$O (wt %) | — | — | — | — | 1.9 |
| SSV | 3.8 | 3.6 | 3.9 | 3.8 | 4.5 |
| b* value | 11.8 | 9.4 | 5.2 | 3.8 | 0.63 |
| EBC Al (ppm)/Al$_2$O$_3$ (wt %) | 5.4 | 4.5 | 2.6 | 3.1 | 1.4 |
| EBC Fe (ppm)/Fe$_2$O$_3$ (wt %) | 16.7 | 12.9 | 15.8 | 8.7 | 6.3 |
| Quartz (wt %) | 0.6 | 0.5 | 0.5 | 0.7 | 0.4 |
| [1]Cristobalite (wt %) | [2]nd | nd | 5 | 15 | 53 |

[1]XRD analysis at EP Minerals lab of Celpure product samples obtained from Sigma-Aldrich
[2]"nd" means non-detectable Taniguchi, one of the inventors of the Shiuh et al patents, discloses diatomite products possessing high silica specific volumes in international application PCT/US2014/067873. Most of the disclosures of Taniguchi appear to have already been in the public domain through Shiuh et al, the Celpure products and literature and data sheets published by Imerys, its subsidiaries and its distributors. Taniguchi does not teach the use of lacustrine diatomite in the production of high performance or ultra-high performance or ultra-high purity diatomite products.

Most of the beneficiation work (e.g., crushing, milling/drying and impurities separation) involving high purity, high performance diatomite has been carried out using wet physical separation processes like attrition scrubbing, hydrocycloning, dispersion, centrifugation, flotation etc. to liberate and separate clay and heavy mineral impurities like chert, quartz, sand etc. (Anastasios, P. K., 1971; Shiuh et al.). Imerys' Celpure manufacturing facility in Lompoc, Calif., USA beneficiates diatomaceous earth through use of attrition scrubbing, hydrocycloning and reverse flotation (Santa Barbara County APCD, draft permit to operate No. 5840—R5 Part II, November 2015). The drawback to these physical separation processes is that they can be inefficient in the selective removal of the impurities. To achieve a high quality product, as in the case of the Celpure® process and also as taught by Shiuh et al, the yield of the beneficiation product is compromised. FIG. 3A depicts the process of Shiuh et al.; and FIG. 3B depicts the Celpure plant process (Santa Barbara County APCD, draft permit to operate No. 5840—R5 Part II, November 2015.) A side-by-side comparison of FIGS. 3A and 3B shows the differences in the process flow diagrams depicting the process by Shiuh et al (FIG. 3A) and the Celpure plant process (FIG. 3B).

The process by Shiuh et al is completed with a calcination unit operation which tends to reduce the centrifuged wet density of the final product and therefore provides for a high silica specific volume. The final product in the Celpure process is obtained by acid washing the calcined product and then drying. Acid washing increases the centrifuged wet density and therefore provides for a product with reduced silica specific volume. However, one of ordinary skill in the art will recognize that the extractable chemistry of the Celpure plant's products will be much lower than those of the products taught by Shiuh et al. because the acid washing step occurs after the calcination unit operation.

SUMMARY

In accordance with one aspect of the disclosure, a filtration product is disclosed. The product may comprise diatomaceous earth having: (i) a permeability of 85 millidarcy to 14,000 millidarcy, (ii) an aluminum oxide content and an iron oxide content, wherein the total aluminum oxide content and the iron oxide content is greater than 7.0 wt % and less than 13 (wt %), and (iii) a silica specific volume greater than 3.5 to 6.2.

In an embodiment, the silica specific volume of the diatomaceous earth may be 4.5 to 6.2. In another embodiment, the silica specific volume of the diatomaceous earth may be 5.5 to 6.2.

In an embodiment, the diatomaceous earth may further have a centrifuged wet density from 0.147 g/ml to 0.176 g/ml. In another embodiment, the diatomaceous earth may have a centrifuged wet density from 0.216 g/ml to 0.226 g/ml.

In an embodiment, the diatomaceous earth may further have a non-detectable level of cristobalite according to the LH Method.

In an embodiment, the diatomaceous earth may further have a silica content of greater than 80 wt % and less than 84 wt % on an ignited basis.

In another embodiment, the diatomaceous earth may further have a silica content of 84 wt % to 87 wt % on an ignited basis.

In yet another embodiment, the diatomaceous earth may further have a silica content of greater than 88 wt % to 92 wt % on an ignited basis.

In another embodiment, the iron oxide content may be greater than 4 wt % on an ignited basis.

In another embodiment, the diatomaceous earth may further have a centrifuged wet density from 0.184 g/ml to 0.208 g/ml.

In an embodiment, the diatomaceous earth may further have a Na$_2$O content from 1.0% to 5.0%, and the permeability may be in the range of 300 millidarcies to 14,000 millidarcies.

In an embodiment, the diatomaceous earth may include a diatom frustule population that contains a plurality of diatom frustules derived from diatoms of the genus *Cymbella*.

In an embodiment, a method of manufacturing the filtration product is disclosed. The method may comprise: selecting a crude diatomaceous earth feed ore for calcining, the feed ore having: (i) a silica content of 80 wt % to 92 wt %, on an ignited basis, (ii) a sum of aluminum oxide and iron oxide contents of 7 wt % to 13 wt %, and (iii) a centrifuged wet density in the range of 0.144 g/ml to 0.240 g/ml; calcining the feed ore at a temperature in a range of 871° C. to 1260° C. to form calcined media, the calcining (a) in the absence of a fluxing agent, or (b) in the presence of 0.5 wt % to 8.0 wt % alkali oxide fluxing agent; and optionally, acid leaching the calcined media with acid, the acid comprising inorganic acid. In a refinement, a calcination retention time may be 15 minutes to 100 minutes. In another embodiment of the method, the acid leaching after calcination may be carried out at 69 kPa to 350 kPa above atmospheric pressure. In another embodiment of the method, the acid leaching after calcination may be carried out at the boiling point of water at atmospheric pressure. In another embodiment of the method, the method may further comprise forming a slurry of the calcined media prior to acid leaching, the slurry having an acid strength of 0.05 mole/liter to 1.0 mole/liter. In another embodiment of the method, the acid leaching retention time may be 20 minutes to 100 minutes. In another embodiment of the method, the inorganic acid may include mineral acid. In a refinement, the mineral acid may include sulfuric acid, nitric acid, hydrofluoric acid, hydrochloric acid, perchloric acid or mixtures thereof. In another embodiment of the method, the acid may further include organic acid. In a refinement, the organic acid may include citric acid, ethylenediaminetetraacetic acid, glutamic acid, malate or mixtures thereof. In another embodiment of the method, the feed ore for the calcining may be subjected to wet kiln feed fluidization.

In accordance with another aspect of the disclosure, a filtration product is disclosed. The product may comprises diatomaceous earth having: (i) a permeability of 85 millidarcy to 14,000 millidarcy, (ii) a b* value in a range of 13 to 20, and (iii) a silica specific volume in a range of 3.5 to 6.2.

In an embodiment, the silica specific volume of the diatomaceous earth may be 4.5 to 6.2, and the b* value may be in a range of 14 to 20. In another embodiment, the silica specific volume of the diatomaceous earth may be 5.5 to 6.2, and the b* value may be in a range of 14 to 20.

In an embodiment, the diatomaceous earth may further have a centrifuged wet density in a range of 0.147 g/ml to 0.176 g/ml, and the b* value may be in a range of 14 to 20. In another embodiment, the diatomaceous earth may further have a centrifuged wet density in a range of 0.216 g/ml to 0.226 g/ml, and the b* value may be in a range of 14 to 20.

In an embodiment, the diatomaceous earth may further have a non-detectable level of cristobalite according to the LH Method.

In an embodiment, the diatomaceous earth may further have a silica content of greater than 80 wt % and less than 84 wt % on an ignited basis.

In another embodiment, the diatomaceous earth may further have a silica content of 84 wt % to 87 wt % on an ignited basis.

In yet another embodiment, the diatomaceous earth may further have a silica content of greater than 88 wt % to 92 wt % on an ignited basis.

In another embodiment, the iron oxide content may be greater than 4 wt % on an ignited basis.

In another embodiment, the diatomaceous earth may further have a centrifuged wet density from 0.184 g/ml to 0.208 g/ml.

In accordance with another aspect of the disclosure, a filtration product is disclosed. The product may comprise diatomaceous earth having: (i) a permeability from 85 millidarcy to 14,000 millidarcy, (ii) a ratio of EBC extractable aluminum to bulk aluminum oxide content of 0.4 to 1.0, wherein the EBC extractable aluminum is measured in parts per million and the bulk aluminum oxide is measured by weight percent, and (iii) a ratio of EBC extractable iron to bulk iron oxide content of 0.4 to 1.1, wherein the EBC extractable iron is measured in parts per million and the bulk iron oxide is measured by weight percent.

In an embodiment, the diatomaceous earth may further have a centrifuged wet density in a range from 0.168 g/ml to 0.183 g/ml.

In an embodiment, the diatomaceous earth may further have a centrifuged wet density in a range from 0.184 g/ml to 0.197 g/ml.

In an embodiment, the diatomaceous earth may further have a centrifuged wet density from 0.198 g/ml to 0.208 g/ml.

In an embodiment, the diatomaceous earth may further have a consumption-adjusted extractable metals factor in a range of 3 to 8 ppm.

In an embodiment, the diatomaceous earth may further have an extractable metals factor in a range of 6 to 14 ppm.

In an embodiment, the diatomaceous earth may further have a consumption-adjusted extractable metals factor from 4 to 8 ppm.

In an embodiment, the diatomaceous earth may further have a consumption-adjusted extractable metals factor from 3 to 5 ppm.

In an embodiment, the diatomaceous earth may further have a beer soluble iron (BSI) content that is non-detectable using the ASBC method, wherein the limit of detection under the ASBC method is 0.1 ppm using GFAA.

In an embodiment, the diatomaceous earth may further have a Na$_2$O content from 1.0% to 5.0%, and the permeability may be in the range of 300 millidarcies to 14,000 millidarcies.

In an embodiment, the diatomaceous earth may include a diatom frustule population that contains a plurality of diatom frustules derived from diatoms of the genus *Cymbella*.

In an embodiment, a method of manufacturing the filtration product is disclosed. The method may comprise: selecting a crude diatomaceous earth feed ore for calcining, the feed ore having: (i) a silica content of 80 wt % to 92 wt %, on an ignited basis, (ii) a sum of aluminum oxide and iron oxide contents of 7 wt % to 13 wt %, and (iii) a centrifuged wet density in the range of 0.144 g/ml to 0.240 g/ml; calcining the feed ore at a temperature in a range of 871° C. to 1260° C. to form calcined media, the calcining (a) in the absence of a fluxing agent, or (b) in the presence of 0.5 wt % to 8.0 wt % alkali oxide fluxing agent; and optionally, acid leaching the calcined media with acid, the acid comprising inorganic acid. In a refinement, a calcination retention time may be 15 minutes to 100 minutes. In another embodiment of the method, the acid leaching after calcination may be carried out at 69 kPa to 350 kPa above atmospheric pressure. In another embodiment of the method, the acid leaching after calcination may be carried out at the boiling point of water at atmospheric pressure. In another embodiment of the method, the method may further comprise forming a slurry of the calcined media prior to acid leaching, the slurry having an acid strength of 0.05 mole/liter to 1.0 mole/liter. In another embodiment of the method, the acid leaching retention time may be 20 minutes to 100 minutes. In another embodiment of the method, the inorganic acid may include mineral acid. In a refinement, the mineral acid may include sulfuric acid, nitric acid, hydrofluoric acid, hydrochloric acid, perchloric acid or mixtures thereof. In another embodiment of the method, the acid may further include organic acid. In a refinement, the organic acid may include citric acid, ethylenediaminetetraacetic acid, glutamic acid, malate or mixtures thereof. In another embodiment of the method, the feed ore for the calcining may be subjected to wet kiln feed fluidization.

In accordance with another aspect of the disclosure, a filtration product is disclosed. The product comprises diatomaceous earth that includes a diatom frustule population. The diatomaceous earth has an intricate and porous structure of diatomite and may have a silica specific volume in a range of greater than 3.5 to 6.2, wherein the diatomaceous earth may be from ore that is sourced from a lacustrine diatomite deposit.

In an embodiment, the diatom frustule population may contain a plurality of diatom frustules derived from diatoms of the genus *Cymbella*. In a refinement, the diatom frustule population may contain a plurality of diatom frustules derived from diatoms of the species *Cymbella designata*.

In an embodiment, the diatomaceous earth may further have an extractable metals factor in a range of 6 to 14 ppm.

In an embodiment, the diatomaceous earth may further have a consumption-adjusted extractable metals factor from 4 to 8 ppm, wherein the silica specific volume may be in the range of 3.9 to 5.1.

In an embodiment, the silica specific volume of the diatomaceous earth may be in a range of greater than 3.9 to 6.2.

In an embodiment, the diatomaceous earth may further have a ratio of EBC extractable aluminum to bulk aluminum oxide content that is in the range of 0.4 to 1.0, wherein the EBC extractable aluminum is measured in parts per million and the bulk aluminum oxide is measured by weight percent.

In an embodiment, the diatomaceous earth further may have a permeability between about 200 millidarcy and 14,000 millidarcy and may contain non-detectable levels of cristobalite when determined using the LH Method.

In an embodiment, the diatomaceous earth may further have a b* value that is in a range of 13 to 20.

BRIEF DESCRIPTION OF THE DRAWINGS

FIG. 3A illustrates a process flow diagram for high purity, high performance diatomite processes of Shiuh et al.;

FIG. 3B illustrates a process flow diagram for high purity, high performance diatomite processes of the Celpure plant;

DETAILED DESCRIPTION

This invention relates to high purity, ultra-high filtration performance biogenic silica products derived from diatomaceous earth. In particular, it relates to products/media containing diatomaceous earth, the diatomaceous earth derived from ores that have been specifically selected for their naturally low centrifuged wet density and which have optionally been intensively processed with very innovative acid treatments to reduce extractable impurities to near detection limits of 0.1 mg soluble metals/kg. The low centrifuged wet density of the selected natural ore is improved to even lower levels during the calcination process and it is maintained after the acid treatment, which provides for products/media with physical properties generally indicative of desirable filtration performance, such as high particulate holding capacities and high flux rates. Another aspect of this disclosure is associated with (non-acid washed) ultra-high performance diatomite filtration products/media that possess a combination of very low extractable chemistry and exceptionally high product flux rate.

The use of wet beneficiation techniques to reduce the mineral purity and lower the centrifuged wet density of a diatomite product in conjunction with the use of acid washing to reduce the extractable impurities of the product both substantially increase the manufacturing cost of diatomite products. In the manufacturing process for the non-acid washed version of the product/media, neither of these expensive processes is employed, yet the product/media has much lower extractable impurities than existing conventional products.

In the high purity version of the product/media of the present disclosure, acid washing is employed, but not a wet beneficiation process. The presence of high aluminum and iron impurities in the absence of any initial wet beneficiation results in calcination products/media that have very high permeabilities and yet are cristobalite-free. The non-acid washed product/media used as feed for the acid washing is produced under optimized calcination conditions to achieve lower metals solubility. The application of an innovative acid treatment process for the already lower soluble metals feed material provides for a much lower extractable metals product/media than the acid washed products of the prior art. The process approach used in this invention therefore provides for lower cost, low extractable chemistry and ultra-high performance diatomite filtration products/media.

Ultra-High Performance Filtration Products/Media (not Acid Washed)

Figure 1:
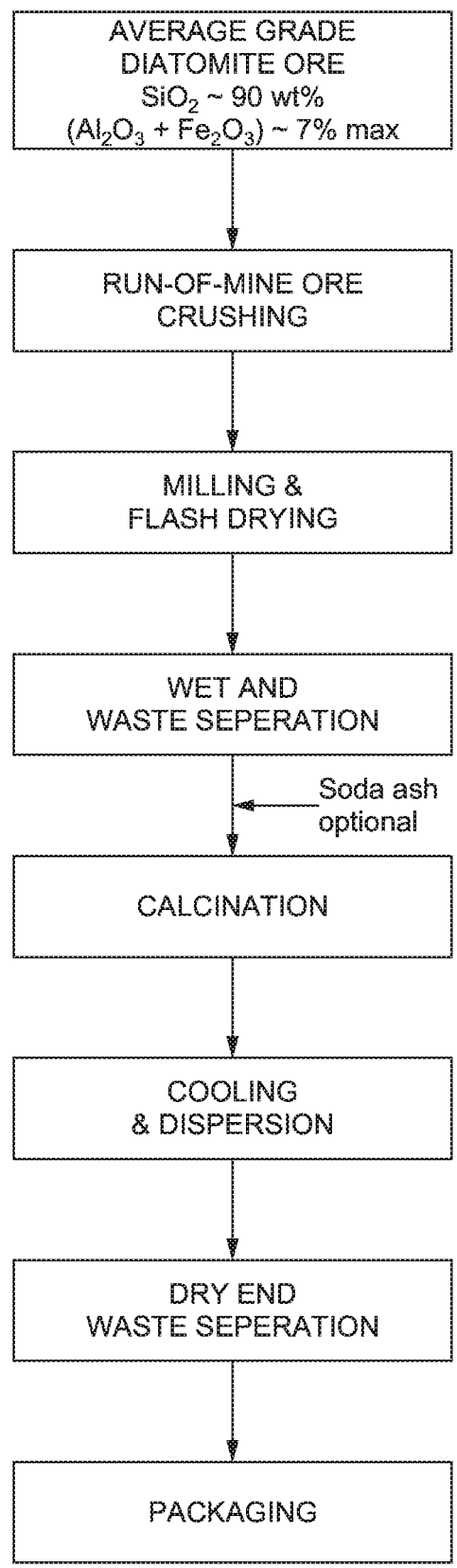
FIG. 1 illustrates a process flow diagram for the manufacturing of conventional diatomite products.
Figure 2:
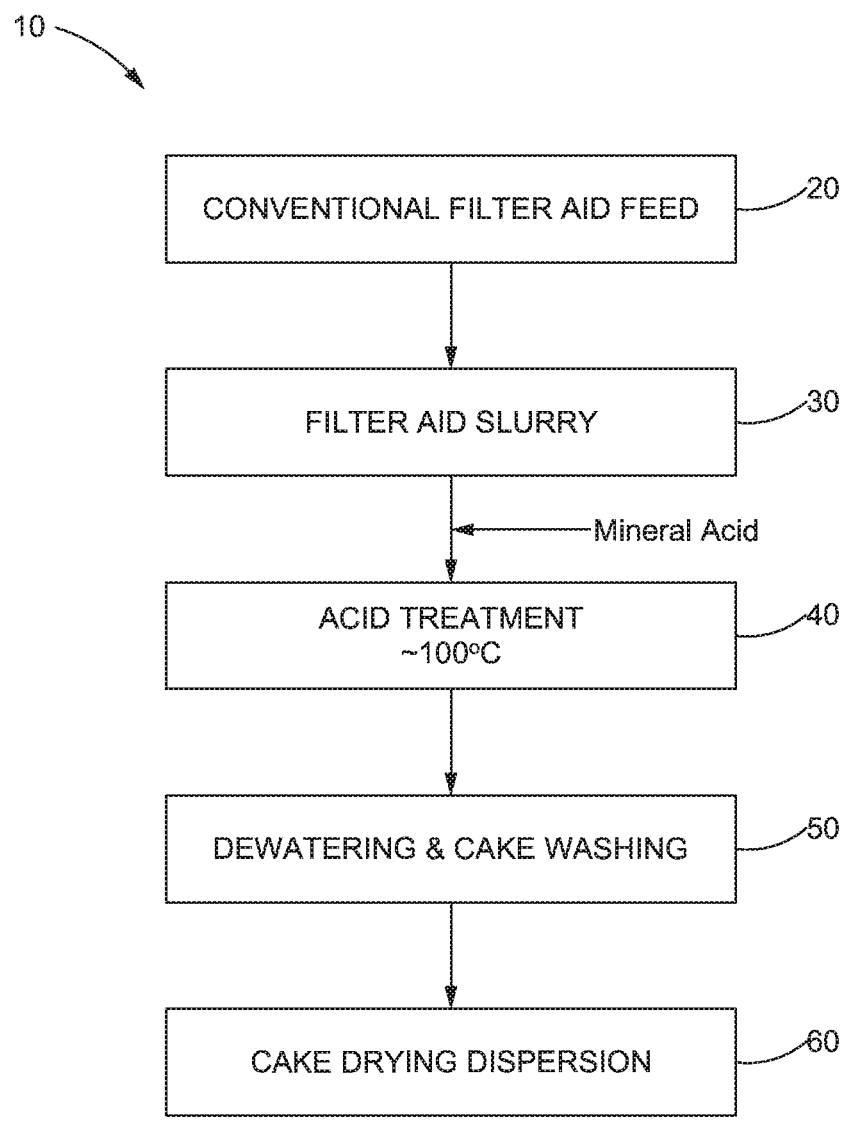
FIG. 2 illustrates a typical acid washing process flow diagram.

The ultra-high performance filtration products/media of this disclosure are filtration media products comprising diatomite which has not been subjected to a beneficiation process to reduce the bulk chemical impurities and has not been subjected to an acid washing process typically (that is, the process of FIG. 2) used for improving extractable metals properties of diatomite products. The products/media are characterized by extremely low centrifuged wet densities and high silica specific volumes relative to current commercially-available diatomite filtration media products.

In accordance with one aspect of the present disclosure, the ultra-high performance filtration products/media provide for filter aid media that covers a range of product permeabilities from 85 to 14,000 millidarcies. One of the unique aspects of these ultra-high performance filtration products/media is that, with the exception of the products/media made within the permeability range of 10,000-14,000 millidarcies, all other products/media are made through "direct run" production, indicating no removal of the fine fraction of the product is required in order to achieve the high permeabilities. Table 5 below shows the range of physical and chemical properties of some of the exemplary ultra-high performance filtration products/media of this disclosure. They all have exceptionally low centrifuged wet densities which provides for high silica specific volumes, even with the relatively lower silica bulk chemistry content of the products/media. The silica specific volume ranges from about 3.5 to about 6.2, which is very high for a non-beneficiated product. The centrifuged wet density for these products/media ranges from about 0.147 g/ml (9.2 lb/ft$^3$) to 0.226 g/ml (14.1 lb/ft$^3$) and averages about 10 lb/ft$^3$-12.0 lb/ft$^3$, an exceptionally low centrifuged wet density, much lower than that of any non-beneficiated product from the prior art or any commercially available product.

The novel products/media disclosed herein are also characterized by high alumina and iron oxide contents with the sum of the aluminum oxide content and the iron oxide content (e.g., $Al_2O_3+Fe_2O_3$) being greater than 7 wt %. This bulk chemistry, as disclosed in Lenz, et al., International Application No. PCT/US16/37816 allows for the production of cristobalite-free products throughout the product permeability range, even in the presence of soda flux. The high impurities content also results in high b* value, even with the high soda ash flux levels in the product. The high performance filtration products/media of the present disclosure have b* values ranging from about 14 to about 20.

The iron oxide content is very high for all of the products/media at a minimum bulk chemistry of 3.9 wt % $Fe_2O_3$. However, the beer soluble iron content (ASBC method) of these products/media is very low due to the processing conditions employed in the calcination operation. The very low centrifuged wet density of these products/media is an indicator that less mass, about 50% less than existing commercial products, of filter aid will be required to filter a given liquid in most filtration operations. Because the most widely-used beverage chemistry test methods for diatomite filtration media, such as the ASBC and EBC methods are based on the use of an equal mass of filtration media, the methods will tend to overstate the level of extractable impurities contained in products possessing lower than average centrifuged wet densities. As a result, the extractable iron in the fluid being filtered will therefore be reduced by approximately fifty percent, resulting in a consumption-adjusted beer soluble iron (CA-BSFe) of 15 ppm or less for all the products/media of the present invention. This is equal to or better than most commercially available conventional diatomite filtration media products, all of which possess considerably higher centrifuged wet densities and lower silica specific volumes. Similar low extractable metals factor levels are obtained for all the products/media in the present disclosure, using the consumption-adjusted factor.

TABLE 5

Properties of Exemplary Ultra-High Performance Filter Aid Products/Media[7]

| $SiO_2$ (wt %) | $Al_2O_3$ (wt %) | $Fe_2O_3$ (wt %) | $Na_2O$ (wt %) | Perm (mD)[1] |
|---|---|---|---|---|
| 80.1-91.6 | 4.0-6.8 | 3.9-5.7 | 0.5-5.9 | 85-14,000 |
| CWD (g/ml) | CWD (lb/ft$^3$) | SSV[2] | EMF (ppm) | CA-EMF[3] (ppm) |
| 0.15-0.23 | 9.2-14.1 | 3.5-6.2 | 145-200 | 75-95 |
| BSFe (ppm)[4] | CA-BSFe (ppm)[5] | Quartz content (wt %) | Color b* value | Cristobalite content (wt %) |
| 16-30 | 8-15 | 0.3-1.5 | 14-20 | nd[6] |

[1]Product Permeability (millidarcy)
[2]SSV—Silica Specific Volume
[3]Consumption-Adjusted Extractable Metals Factor
[4]Beer Soluble Iron - ASBC method
[5]Consumption-Adjusted Beer Soluble Iron - ASBC method
[6]non-detectable
[7]bulk chemistry on an ignited basis Ultra-High Performance Filtration Products/Media with High Purity The high purity, ultra-high performance filtration products/media of this disclosure contain diatomaceous earth and are unique for high performance diatomite products, in that they are not subjected to any beneficiation process to significantly reduce the bulk chemical impurities but have undergone an innovative acid washing process to significantly reduce the extractable metals and an innovative calcination process to maintain an extremely light density product/media after the acid treatment. Due to the very low centrifuged wet densities of these products/media, they possess higher particulate holding capacity than commercially available high purity diatomite filter aid products and any other products in the prior art.

The high purity, ultra-high performance filtration products of this disclosure provide for filter aid media/products that covers a range of product permeabilities from 85 millidarcies to 14,000 millidarcies, with extremely low extractable chemistries. Table 6 below shows the unique physical and chemical properties of the exemplary high purity, ultra-high performance filtration products/media of this disclosure. These products/media have exceptionally low centrifuged wet density which provides for high silica specific volumes. The silica specific volume lies within a very tight range of about 3.9 to about 5.1, which is extremely high for a non-beneficiated high purity product. The centrifuged wet density for these products/media ranges from about 0.168 g/ml (10.5 lb/ft3) to about 0.208 g/ml (13.0 lb/ft$^3$) and averages about 0.176 g/ml (11.0 lb/ft$^3$) to about 0.200 g/ml (12.5 lb/ft3), an exceptionally low density for a high purity diatomite product, much lower than that of any product from the prior art or any commercially available product of its class. These high purity products/media are characterized by high alumina and iron oxide content with $Al_2O_3+Fe_2O_3$ being greater than about 7 wt %. The high impurity content results in high b* value of the products/media, even at high soda ash flux concentration. This bulk chemistry provides for cristobalite-free products/media, even at these higher permeabilities and in the presence of soda flux. There is therefore a correlation between high iron and aluminum impurities, high b* value and the formation of cristobalite-free products. The b* value for the high purity products/media of the present disclosure ranges from about 13 to about 18, which is exceptionally high for flux-calcined products. The impact of the high impurity levels in the product is mitigated after the acid treatment with a resultant low extractable metals. The extractable metals factor, EMF, which indicates the total amount of aluminum, iron and calcium metals solubility using the European Brewery Convention (EBC) test method, is very low at 14 or less. The extremely low centrifuged wet density of the high purity products/media provides for consumption-adjusted extractable metals factor (CA-EMF) of between about 3 and about 8, values that are extremely low in comparison to any product of this category. The beer soluble iron content of these products/media are non-detectable (nd) based on the American Society of Brewery Chemist (ASBC) test method. The ratio of the EBC extractable aluminum to the bulk aluminum oxide chemistry (wt %) is between about 0.4 and about 1.0 and the ratio of the EBC extractable iron to the bulk iron oxide chemistry (wt %) is about 0.4 to about 1.1 for the high purity products/media. These ratios indicate the ease of extraction of the impurities into solution, and a lower number indicates a much inert product.

TABLE 6

Exemplary High Purity, Ultra-High Performance Filter Aid Products/Media[6]

| SiO2 (wt %) | $Al_2O_3$ (wt %) | $Fe_2O_3$ (wt %) | $Na_2O$ (wt %) | Perm (mD)[1] | CWD (g/ml) |
|---|---|---|---|---|---|
| 81.1-92.0 | 4.0-6.7 | 2.4-5.5 | 0.5-5.2 | 85-14,000 | 0.17-0.21 |

| CWD (lb/ft[3]) | EBC Al (ppm)/ $Al_2O_3$ (wt %) | EBC Fe (ppm)/ $Fe_2O_3$ (wt %) | EMF[2] (ppm) | CA-EMF[3] (ppm) | BSFe (ppm)[4] |
|---|---|---|---|---|---|
| 10.5-13.1 | 0.4-1.0 | 0.4-1.1 | 5-14 | 3-8 | nd[5] |

| SSV[1] | Quartz content (wt %) | Color b* value | Cristobalite content (wt %) |
|---|---|---|---|
| 3.9-5.1 | 0.3-1.5 | 13-18 | nd[5] |

[1]SSV—Silica Specific Volume
[2]Extractable Metals Factor: EBC test method, Extractable Metals Factor = Σ(Al, Fe, Ca)
[3]Consumption-Adjusted Extractable Metals Factor: EBC test method
[4]Beer Soluble Iron - ASBC test method: note the lowest amount that can be detected (the limit of detection (LD)) for the ASBC method is 0.1 ppm using GFAA
[5]nd—non-detectable values (subtraction of beer background Fe gives zero results - ASBC)
[6]bulk chemistry on an ignited basis Methods of Preparing Ultra-High Performance Diatomite Filtration Products/Media Unlike a typical diatomite manufacturing process, which begins with ore possessing centrifuged wet densities that fall within the range of ores used to manufacture conventional diatomite filtration products, the process for preparing products/media of the present disclosure begins with a selection of ores possessing exceptionally low centrifuged wet densities.

Another aspect of the selection of ore for the present invention is the chemistry of the crude ore. Due to the low centrifuged wet density ore used in the manufacture of the products/media of the present invention, there is more flexibility in selecting ores that may possess a higher level of impurities than ores used in most commercial diatomite filtration products.

In one embodiment of the present disclosure diatomite ore selected is lacustrine in origin and preferably is predominantly or substantially comprised of a diatom frustule derived from the genus *Cymbella* and preferably from the species *Cymbella designata*.

Another unique aspect of the present disclosure is related to the calcination process where the technique of wet kiln feed fluidization is employed to decrease the bulk density of the ore prior to thermal processing. The net effect is a product/media which possesses both very low centrifuged wet density and higher permeability than could otherwise be achieve. U.S. Pat. No. 8,410,017 ("Nyamekye et al.) teaches kiln feed pre-agglomeration with water for high density feed ores with large amounts of fine particulates and having wet density of about greater than 25 lb/ft[3] and permeability of less than about 10 millidarcies. The present disclosure however utilizes wet feed fluidization on ores that already have very low density in the range of 9-15 lb/ft[3] (0.144 g/m to 0.240 g/ml) and permeabilities in a range of greater than 50 millidarcies to 200 millidarcies. Other prior art related to the addition of water to diatomaceous earth kiln feed to improve the product permeability after calcination is disclosed in U.S. Pat. No. 3,013,981 ("Riede, R. G.") and U.S. Pat. No. 2,693,456 ("Fennell, J. E.").

Another unique aspect of this invention is related to the final acid treatment of the ultra-high performance diatomite product/media to obtain high purity grades with very low extractable metals. The final acid treatment is carried out with acid addition of an inorganic acid and an organic acid. In a preferred embodiment, the final acid treatment is carried out using staged acid addition of an inorganic acid (e.g., a mineral acid) followed by an organic acid, such as citric acid, to chelate any residual metal solubles remaining in the product/media, all this done under ambient conditions. Depending on the maximum extractable metals that may be tolerated by the product/media application, the final acid treatment of the product/media may also be carried out under pressure, above atmospheric. Acid treatment under pressure results in metal extractables that are extremely low, lower than that of any currently available diatomite filtration media product on the market and any product described in the prior art for high purity grades.

Figures 4A, 4B:
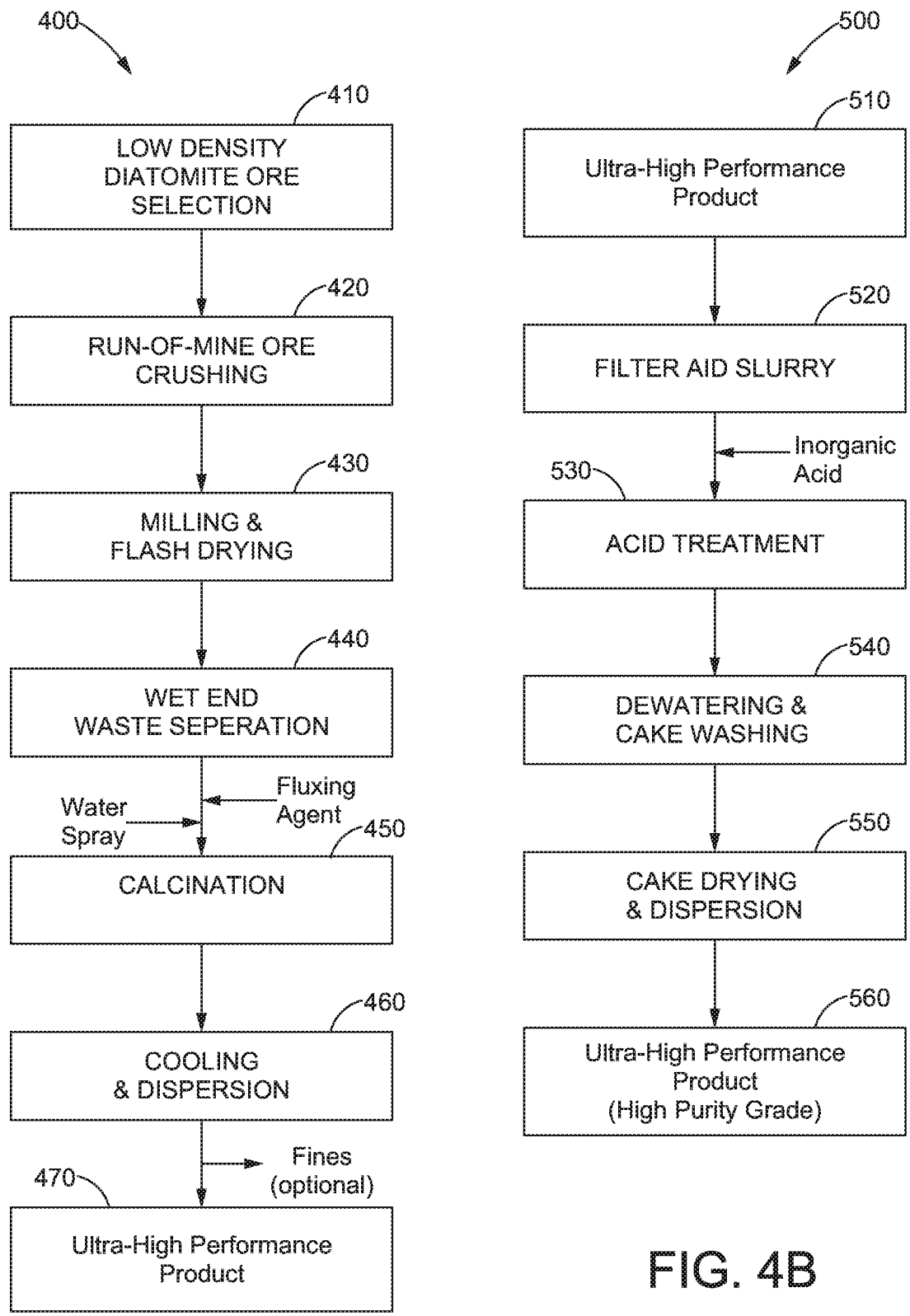
FIG. 4A illustrates a process flow diagram for manufacturing ultra-high performance filtration products/media.
FIG. 4B illustrates a process flow diagram for manufacturing high purity, ultra-high performance filtration products/media.

The process flow diagrams for manufacturing the ultra-high performance filtration products/media discussed herein are shown in FIGS. 4A-B. The manufacturing process 400 for conventional (not acid washed) ultra-high performance filtration products/media is illustrated in FIG. 4A. The manufacturing process 500 for the high purity, ultra-high performance filtration products/media (the high purity version of the ultra-high performance filtration products/media) is shown in FIG. 4B. The resulting product/media from the process 400 of FIG. 4A can be used directly in the filtration of liquids or can be used as the raw material for manufacturing the high purity product/media that results from the process 500 of FIG. 4B.

The manufacturing process 400 for the conventional (not acid washed) grades includes low density crude ore selection, crushing, flash drying, waste separation, calcination and cooling/dispersion, as discussed below with respect to FIG. 4A.

Block 410 of the process 400, includes identifying and selecting an appropriate diatomite crude ore. An appropriate diatomite crude ore is identified and selected based on the result of a CWD test and the bulk chemistry of the ore. To identify a diatomite crude ore with the appropriate low centrifuged wet density, a representative sample of the crude ore is dried and hammer-milled to pass 80 mesh size. Then, another (a second) representative sample is taken from the powder that passed through the 80 mesh size. This sample of the powder is then subjected to a centrifuged wet density test to determine if the centrifuged wet density is in the range of 0.144 g/l (9.0 lb/ft$^3$) to 0.240 g/ml (15 lb/ft$^3$). The standard operating procedure for carrying out the centrifuged wet density test is described herein under the "Methods of Characterizing the Ultra-high Performance Diatomite Filtration Products/Media and the High Purity, Ultra-high Performance Diatomite Filtration Products/Media" section of this disclosure. This process 400 will tolerate ores with higher impurities level with the lower density specification and will handle diatomaceous earth ores with silica contents as low as 80 wt % $SiO_2$ on an ignited basis and as high as about 92 wt %, and the sum of aluminum and iron oxide ($Al_2O_3+Fe_2O_3$) contents may be as high as 13 wt %. Thus, the diatomite crude ore that is selected, in block 410, as a diatomite crude ore feed for the remainder of the process 400 has: (1) a CWD in the range of 0.144 g/ml to 0.240 g/ml; (2) a silica content in the range of 80 wt % $SiO_2$ on an ignited basis to about 92 wt % on an ignited basis; and (3) the sum of aluminum oxide and iron oxide (e.g., $Al_2O_3+Fe_2O_3$) contents in the range of about 7 wt % to about 13 wt %. Unlike the ultra-high filtration performance diatomite products of the prior art, which are produced from marine (salt water) diatomites that contain diatom frustules derived from many different diatom genera, the products of the present disclosure may be produced from lacustrine (fresh water) diatomites in which there are often diatom frustules derived from only one or, in some cases, only two or three, diatom genera. More specifically, the diatomite crude ore selected is comprised of a diatom frustule population.

In an embodiment, the diatom frustule population may include a plurality of diatom frustules derived from diatoms of the genus *Cymbella*. In a refinement, at least 70%-80% of the diatom frustules of the diatom frustule population may be derived from diatoms of the genus *Cymbella*. In another refinement, the diatoms of the genus *Cymbella* may be of the species *designata*. In a further refinement, at least 70%-80% of the diatom frustules of the diatom frustule population may be derived from diatoms of the genus *Cymbella* and species *designata*.

In block 420, the crude ore identified in block 410 as an appropriate low density crude ore feed is crushed.

In block 430, the crushed crude ore resulting from block 420 is flash dried. To preserve the particle integrity of the crushed crude ore feed ore during the flash drying step, the flash dryer is configured to use an inline double cone static classifier. With this setup, the crushed crude ore feed is gently milled during the flash drying operation and any coarse particles that do not pass the particle size specification are returned to the mill through the coarse discharge of the inline double cone classifier.

In block 440, the resulting dried powder from block 430 is subjected to dry heavy mineral impurities wet end waste separation, when warranted, to remove quartz, chert, sand and other heavy foreign matter in the ore through the use of an air separator or air classifier.

In block 450, the dried separated product/media resulting from block 440 is calcined. The calcination process conditions are selected such that the kiln discharge product/media has permeability within the target permeability range for the desired product/media. As part of block 450, a fine milled fluxing agent (e.g., soda ash) is thoroughly blended into the dried separated product/media (from block 440) and the resultant blend is discharged into a ribbon blender and mixed with about 4.0 wt % to about 6 wt % of fine mist of atomized water to wet the surface of the diatomite particles, the net effect being a moist/wet fluidized kiln feed material with a lower, loose weight density. Such feed may be calcined at a temperature in the range of 871° C. to 1260° C. (1600° F. to 2300° F.) for a period ranging from about 15 minutes to about 100 minutes. In some embodiments, the feed may be calcined at a temperature in the range of 982° C. to 1204° C. (1800° F. to 2200° F.) for a period ranging from 20 minutes to 60 minutes. The amount of fluxing agent (e.g., soda ash) used for generating products/media with permeabilities of 85 millidarcies to 4000 millidarcies generally ranges from 0.5 wt % to 8 wt % depending on the appropriate calcination temperature. The flux calcination process may be carried out in a directly-fired kiln in which the feed makes direct contact with the flame from the kiln burner. Alternatively an indirectly-fired kiln, in which the shell of the kiln is heated from the outside and the material being calcined does not make any direct contact with the burner flame and calcination is achieved through heat conduction, may be employed.

In block 460 the result of block 450 is cooled, and dispersed with a centrifugal sifter, or the like to produce the ultra-high performance filtration product/media of block 470. Optionally, fines may also be removed.

FIG. 4B depicts the manufacturing process 500 for the high purity products/media taught by this disclosure; such products/media may be characterized by low extractable metals.

In block 510, the ultra-high performance product/media of block 470 is utilized as feed for process 500. The process 500 then proceeds from block 510 to block 520.

In block 520, the product/media of block 510 is dispersed into powder and then slurried into 10 wt % to 15 wt % solids to prepare it for polish leaching.

In block 530, the slurry is (acid) leached in a glass reactor (or the like) using an acid. In an embodiment, the acid may comprise inorganic acid. In another embodiment, the acid may comprise inorganic acid and organic acid. The inorganic acid may include mineral acid. The mineral acid may include sulfuric acid, nitric acid, hydrochloric acid, or mixtures thereof. The organic acid may include citric acid, ethylenediaminetetraacetic acid, glutamic acid, malate or mixtures thereof. In an embodiment, the aggregate inorganic acid strength used may be 0.05 M to 1.0 M. In one embodiment, the aggregate inorganic acid strength used may be 0.1 mole/liter (M) to 0.5 mole/liter (M). The aggregate dosage of organic acid used may be 8.0 kg/ton to 15.0 kg/ton of product solids. For acid leaching, the acid leaching retention time may be 20 minutes to 100 minutes. In an embodiment, the temperature may range from 80° C. to 95° C. under ambient pressure. For example, in a preferred embodiment, a total of 1 hour polish leaching retention time at 95° C. under ambient pressure may be used. In another embodiment, where the highest purity of the resulting product/media is desired (in other words, a product/media having a very low content of extractable impurity), the slurry of block 520 may be polish leached under pressure using the same acid concentration as would be used to acid leach under ambient pressure but with the temperature increased to a temperature in the range of 110° C. to 150° C. In one such embodiment, the slurry of block 520 may be acid leached at a pressure of 69 kPa to 350 kPa (10 PSI to 50 PSI) above atmospheric pressure. In another embodiment, the slurry of block 520 may be acid leached at the boiling point of water at atmospheric pressure.

In block 540, at the end of the leaching of block 530, the resulting leached slurry is dewatered and the resulting cake is thoroughly rinsed with deionized water using a pressure filter to ensure that the conductivity of 10 wt % slurry of the dried product/media is less than 20 μS/cm.

In block 550, the cake is dried and dispersed to obtain the final high purity, ultra-high performance diatomite filtration media/product of the present disclosure. To maintain the integrity of the diatom particles and preserve the centrifuged wet density of the product/media, drying of the cake may take place in a static dryer, typically a tray dryer and the dried cake may be dispersed with the use of a centrifugal sifter.

Figure 7A:
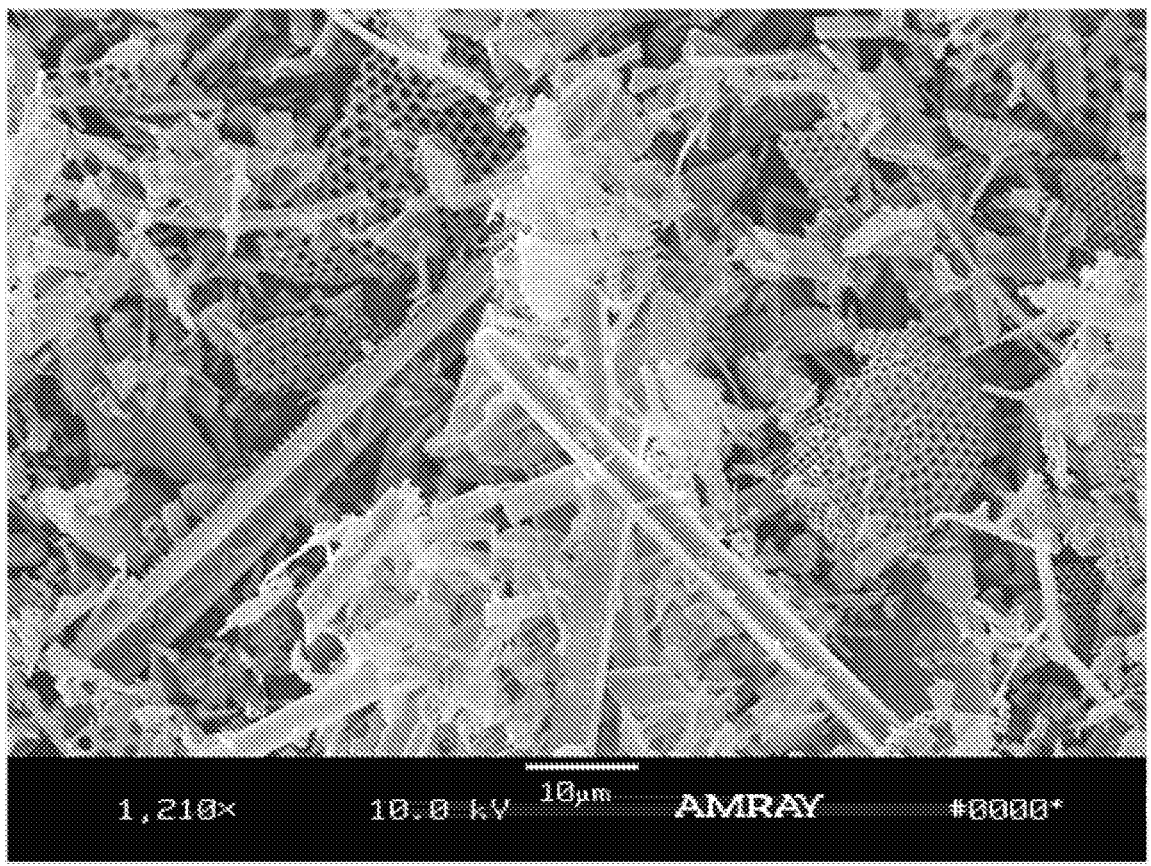
FIG. 7A is a Scanning Electron Micrograph (SEM) of marine diatomite containing multiple genera and species of marine diatoms.
Figure 7B:
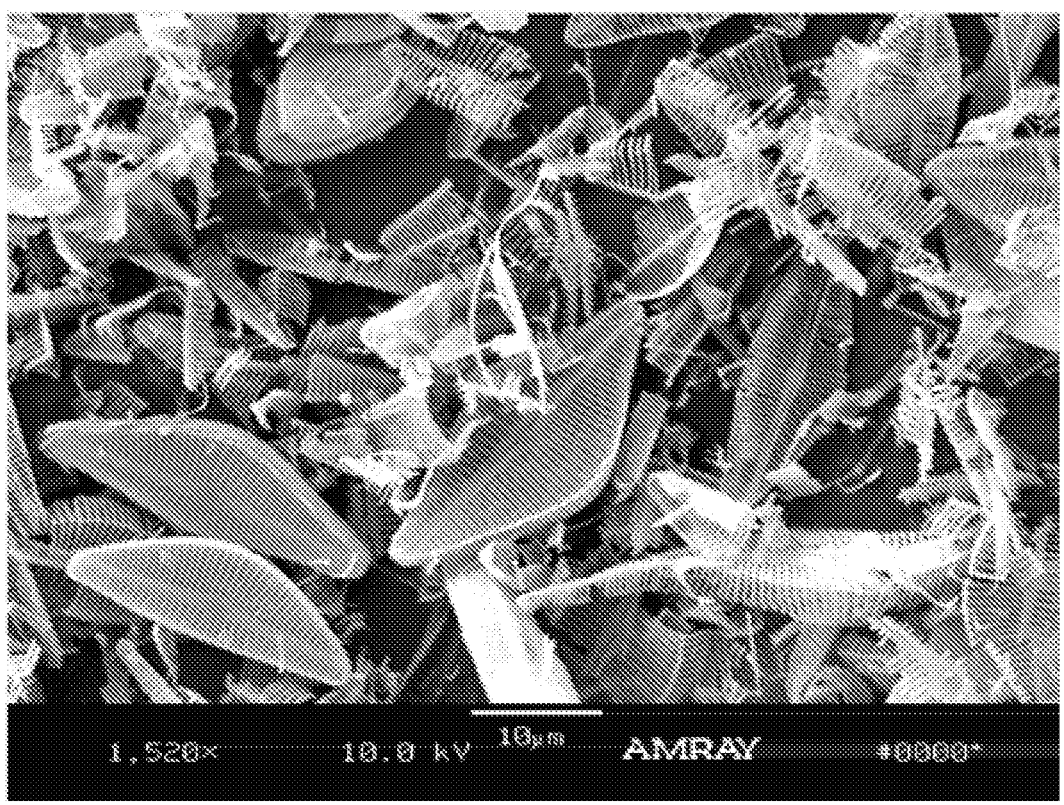
FIG. 7B is a SEM of Lacustrine Diatoms of the present disclosure—containing predominantly of frustules of the genus *Cymbella*.

Comparison of the Ultra-High Performance Products/Media of the Present Invention with the Prior Art The present disclosure provide for ultra-high performance filtration products/media which are classified into: (1) filter aids comprising diatomite with an extractable metals factor lower than comparable conventional products; and (2) high purity filter aids comprising diatomite produced by acid washing the diatomite product/media of (1) and obtaining an extractable metals factor that is lower than any comparative high purity products in the prior art. Apart from the low extractable metals factor of these ultra-high performance filter aids, these products/media also show an exceptionally low centrifuged wet density and high silica specific volume which surpass other comparable grades of products in the prior art. An important characteristic of these products/media is that they contain levels of impurities, such as alumina and iron oxide, which are normally indicators of high product densities, yet the products/media of the present invention possess unusually low densities. It is also surprising and unexpected that diatomite products possessing such high levels of non-diatomite minerals can also be characterized as possessing unusually low extractable chemistries, even before acid leaching. In addition, unlike the ultra-high filtration performance diatomite products of the prior art, the products of the present disclosure are derived from lacustrine diatomites and may, as a result, contain diatom frustules derived from only one to three genera of diatoms. FIG. 7A shows a scanning electron micrograph (SEM) of the diatom assemblages of the prior art Celpure products (in this case Celpure 65), which are produced from marine diatomite (diatom frustules which were produced by diatoms in bodies of salt water) of Lompoc, Calif. and FIG. 7B shows the SEM of the ultra-high filtration performance diatomite products of the present disclosure, which are produced from lacustrine diatomite (diatom frustules produced by diatoms in bodies of fresh water). As can be seen in SEM of FIG. 7A, the marine diatomite of the exemplary Celpure product contains multiple genera and species of marine diatoms.

Wide Range of Permeabilities

This disclosure teaches a method of producing ultra-high performance filtration products/media with permeabilities ranging from about 85 millidarcies up to about 10,000 millidarcies, utilizing "direct-run" production (without the use of post-calcination classification) which does not depend on fines classification to achieve high permeability. Such an approach is made possible by utilizing the technique of wet kiln feed fluidization which solubilizes the fluxing agent (e.g., soda ash) to make it reactive for particle agglomeration and also reduces the feed bulk density, which ultimately provides for lower calcined product/media density. These factors result in higher permeability of the calcined product/media, almost twice as high as comparable conventional products which do not undergo wet kiln feed fluidization. In contrast, conventional products with permeability of 1000 millidarcies or higher are made by the classification (and removal) of fines after calcination. Even so, most commercial fast flow rate products only have permeabilities up to the 8000 millidarcies after fines removal. For high purity, high performance products known in the prior art, such as the Celpure® products of Imerys, permeability is only up to 1000 millidarcies. The acid washed grades (Celite AW and Celatom PurifiDE) show permeabilities only in the range of 3000 millidarcies grade as indicated in Table 11.

Very Low Centrifuged Wet Densities

Table 7A shows the range of centrifuged wet density (CWD) for the various ultra-high performance filtration products/media of the present invention versus prior art products in the 85 millidarcies to 14,000 millidarcies range. The centrifuged wet density range for the present invention represents the ultra-high performance filtration products/media and the high purity versions of the ultra-high performance filtration products/media. The ultra-high performance products/media, which are comparable to conventional diatomite filtration products, are slightly lower in CWD than the acid washed, high purity, ultra-high performance products by design. Table 7A shows that, for each permeability range of the products/media, the centrifuged wet density for the products/media of the present disclosure is significantly lower than the products of the prior art. The exemplary high performance products/media of the present disclosure have centrifuged wet density ranging from 0.147 g/ml (9.2 lb/ft$^3$) 0.226 g/ml (14.1 lb/ft$^3$) in comparison to the conventional products of the prior art, ranging from 0.294 g/ml (18.4 lb/ft$^3$) to 0.465 g/ml (29.0 lb/ft$^3$). The products/media of the present disclosure that are comparable to conventional products (in other words, the ultra-high performance filtration products/media that are not the high purity versions of this disclosure) have centrifuged wet density that is at least 50% lower than known in the prior art for non-beneficiated diatomite filtration media. The high purity products/media, shown in Table 7B, have centrifuged wet density ranging between 0.168 g/ml (10.5 lb/ft$^3$) and 0.208 g/ml (13.0 lb/ft$^3$), which is still much lower than both the conventional, not acid washed products, and the acid washed, not beneficiated products, of the prior art. The centrifuged wet densities of the high purity products are also significantly lower than that of the acid washed products (Celite AW Grades—FilterCel, Standard SuperCel, Hyflo SuperCel, Celite 535; Celatom AW Grades—PurifiDE AW3, PurifiDE AW2, PurifiDE AW20) that have centrifuged wet density ranging from 0.32 g/ml to 0.37 g/ml as shown in Table 7B. The beneficiated and acid washed Celpure products (Celpure 100, 300 and 1000) of the prior art possess centrifuged wet densities in the range of 0.213 g/ml to 0.256 g/ml, which are higher than the products of the present disclosure.

TABLE 7A

Centrifuged Wet Density (g/ml) of Exemplary Novel Ultra-High Performance Products/Media Disclosed Herein and the Prior Art Conventional Products

| Permeability Range (mD) | Present Disclosure | Celite Filter Aid | Radiolite Filter Aid | Celatom Filter Aid | Dicalite Filter Aid | CECA[9] Filter Aid |
|---|---|---|---|---|---|---|
| [1]85-200 | 0.171-0.205 | 0.353 | 0.400 | 0.385 | 0.465 | 0.410 |
| [2]200-700 | 0.147-0.176 | 0.304 | 0.380 | 0.370 | 0.433 | 0.410 |
| [3]701-1,500 | 0.171-0.184 | 0.294 | 0.380 | 0.337 | 0.417 | 0.395 |
| [4]1,501-3,500 | 0.168-0.192 | 0.304 | 0.330 | 0.320 | 0.401 | 0.380 |
| [5]3,501-6,000 | 0.165-0.176 | 0.321 | 0.330 | 0.300 | 0.337 | 0.380 |
| [6]6,001-10,000 | 0.152-0.223 | n/a[8] | 0.330 | 0.304 | n/a | 0.380 |
| [7]10001-14,000 | 0.160-0.226 | n/a | n/a | n/a | 0.351 | 0.380 |

[1]Celite FilterCel, Radiolite 200, Celatom FP1, Dicalite WB6, CECA Clarcel CBR
[2]Celite standard SuperCel, Radiolite 300, Celatom FP4, Dicalite 231, CECA Clarcel CBL3
[3]Celite Hyflo SuperCel, Radiolite 600, Celatom FW12, Dicalite 341, CECA Clarcel DIFBO
[4]Celite 535, Radiolite 900, Celatom FW40, Dicalite Speedex, CECA Clarcel DICS
[5]Celite 545, Radiolite 900S, Celatom FW60, Dicalite 2500, CECA Clarcel DITR
[6]Radiolite 1100, Celatom FW80, CECA Clarcel DIT2R
[7]Dicalite 4500
[8]n/a—not available
[9]CECA filter aid product(s) now produced by Calgon Carbon

TABLE 7B

Centrifuged Wet Density (g/ml) of Exemplary Novel High Purity, Ultra-High Performance Products/Media Disclosed Herein and the Prior Art High Purity Products

| Permeability Range (mD) | Present Disclosure | Celite AW Grade | Celatom AW Grade | Celite Analytical Filter Aid | Celpure Grades |
|---|---|---|---|---|---|
| [1] 85-200 | 0.188-0.208 | 0.330 | n/a | n/a | 0.250 |
| [2]200-700 | 0.188-0.208 | 0.330 | 0.370 | 0.290 | 0.256 |
| [3] 701-1,500 | 0.178-0.208 | 0.330 | 0.337 | n/a | 0.213 |
| [4]1,501-3,500 | 0.179-0.208 | 0.330 | 0.320 | n/a | n/a |
| [5]3,501-6,000 | 0.173-0.204 | n/a | n/a | n/a | n/a |
| 6,001-10,000 | 0.168-0.200 | n/a[5] | n/a | n/a | n/a |
| 10,001-13,000 | 0.179-0.200 | n/a | n/a | n/a | n/a |

[1]Celite FilterCel, Celpure 100
[2]Celite Standard SuperCel, Celatom PurifiDE AW3, Celite Analytical Filter Aid, Celpure 300
[3]Celite AW Hyflo SuperCel, Celatom PurifiDE AW12, Celpure 1000
[4]Celite AW 535, Celatom PurifiDE AW20
[5]n/a—not available Very High Silica Specific Volumes The silica specific volume (SSV) is a measure of the combined effect of the silica content of the diatomite and the centrifuged wet density; the higher the SSV value the better the diatomite product's usefulness in filtration. Table 8A shows the silica specific volume data for the present disclosure and those of the prior art conventional products for the range of permeabilities from 85 millidarcies to 14,000 millidarcies products. In spite of the relatively lower silica content of the products/media of the present disclosure, the significantly high centrifuged wet densities of the products/media still provide for much higher silica specific volumes in comparison to the products of the prior art. The silica specific volume of the products/media of the present disclosure is much higher than the prior art for each product. It ranges from 3.5 to 6.2 for the high performance products/media in comparison to the conventional products of the prior art with silica specific volume ranging from 2.0 to 3.1. For the purified products/media of this disclosure, shown in Table 8B, the silica specific volume ranged from 4.7 to 6.1, which is still higher than the conventional products of the prior art. In comparison to beneficiated Celpure products and acid washed products (Table 8B), the silica specific volumes of the novel products/media of the present disclosure are higher.

TABLE 8A

Silica Specific Volume of Exemplary Ultra-High Performance Products/Media and the Prior Art Conventional Products

| Permeability Range (mD) | Present Disclosure | Celite Filter Aid | Radiolite Filter Aid | Celatom Filter Aid | Dicalite Filter Aid | CECA[9] Filter Aid |
|---|---|---|---|---|---|---|
| [1]85-200 | 4.5-5.2 | 2.5 | 2.3 | 2.4 | 2.0 | 2.2 |
| [2]200-700 | 4.8-6.2 | 3.0 | 2.4 | 2.5 | 2.2 | 2.2 |
| [3]701-1,500 | 4.5-5.2 | 3.1 | 2.4 | 2.6 | 2.3 | 2.2 |
| [4]1,501-3,500 | 4.3-5.0 | 2.9 | 2.7 | 2.8 | 2.3 | 2.2 |
| [5]3,501-6,000 | 4.7-5.2 | 2.9 | 2.7 | 3.0 | 2.8 | 2.3 |
| [6]6,001-10,000 | 3.6-5.9 | n/a[8] | 2.7 | 2.9 | n/a | 2.3 |
| [7]10001-14,000 | 3.5-5.3 | n/a | n/a | n/a | 2.6 | 2.3 |

[1]Celite FilterCel, Radiolite 200, Celatom FP1, Dicalite WB6, CECA Clarcel CBR
[2]Celite standard SuperCel, Radiolite 300, Celatom FP4, Dicalite 231, CECA Clarcel CBL3
[3]Celite Hyflo SuperCel, Radiolite 600, Celatom FW12, Dicalite 341, CECA Clarcel DIFBO
[4]Celite 535, Radiolite 900, Celatom FW40, Dicalite Speedex, CECA Clarcel DICS
[5]Celite 545, Radiolite 900S, Celatom FW60, Dicalite 2500, CECA Clarcel DITR
[6]Radiolite 1100, Celatom FW80, CECA Clarcel DIT2R
[7]Dicalite 4500
[8]n/a—not available
[9]CECA filter aid product(s) now produced by Calgon Carbon

TABLE 8B

Silica Specific Volume of Exemplary High Purity, Ultra-High Performance Products/Media and the Prior Art High Purity Products

| Permeability Range (mD) | Present Disclosure | Celite AW Grades | Celatom AW PurifiDE | Celite Analytical Filter Aid | Celpure Grades | Shiuh et al. (2001) |
|---|---|---|---|---|---|---|
| [1]85-200 | 4.8-5.2 | 2.7 | n/a | n/a | 3.9 | n/a |
| [2]200-700 | 4.7-6.1 | 2.8 | 2.5 | 3.4 | 3.8 | 4.7 |
| [3]701-1,500 | 5.0-5.2 | 2.7 | 2.7 | n/a | 4.5 | 6.1 |
| [4]1,501-3,500 | 5.0-5.0 | 2.8 | 2.9 | n/a | n/a | |
| [5]3,501-6,000 | 5.0-5.2 | n/a | n/a | n/a | n/a | |
| 6,001-10,000 | 5.1-5.9 | n/a[5] | n/a | n/a | n/a | |
| 10001-13,000 | 5.0-5.3 | n/a | n/a | n/a | n/a | |

[1]Celite FilterCel, Celpure 100
[2]Celite Standard SuperCel, Celatom PurifiDE AW3, Celite Analytical Filter Aid, Celpure 300
[3]Celite AW Hyflo SuperCel, Celatom PurifiDE AW12, Celpure 1000
[4]Celite AW 535, Celatom PurifiDE AW20
[5]n/a—not available Extractable Metals Factor (EMF)—Utilizing EBC Method The Extractable Metals Factor (EMF) is a measure, under standard conditions, of the several extractable impurities contained in a filtration media. More specifically, the EMF is a measure of the sum of the extractable aluminum, iron and calcium contained in a standard mass of the product under conditions specified by the European Brewing Convention (EBC) for the measurement of extractable iron.

A comparison of the consumption-adjusted Extractable Metals Factor (CA-EMF) of the ultra-high performance products/media of the present invention and those of representative commercial products from the prior art are shown in Table 10 below.

As Table 10 shows, the non-acid washed products/media of the present disclosure possess significantly lower consumption-adjusted extractable metals factors than the non-acid washed products from the prior art. The basis for the estimation of the consumption-adjusted extractable metals factors (CA-EMF) for the products/media of the present disclosure and the products from the prior art is for a standard product with a centrifuged wet density of 0.337 g/ml (21.0 lb/ft$^3$). The Consumption-Adjusted Extractable Metals Factor is the centrifuged wet density of the filter aid (or media) divided by the centrifuged wet density of a typical DE filter aid (or media) multiplied by the Extractable Metals Factor for the filter aid (FA) (or media). For example, the consumption-adjusted extractable metals factor for the lower density product of this disclosure is given as:

$$\text{Consumption-Adjusted } EMF = \frac{CWD \text{ of low density filter aid}}{CWD \text{ of Standard } DE \text{ Filter aid}} \times (EMF \text{ of low density } FA)$$

TABLE 10

Consumption-Adjusted Extractable Metals Factor (CA-EMF) (in ppm) of Exemplary Ultra-High Performance Products/Media and the Prior Art Products

| Permeability Range (mD) | Present Disclosure | Celite Filter Aid | Radiolite Filter Aid | Celatom Filter Aid | Dicalite Filter Aid | CECA[9] Filter Aid |
|---|---|---|---|---|---|---|
| [1]85-200 | 82-95 | 317 | 336 | 396 | 576 | 1430 |
| [2]200-700 | 76-85 | 282 | 157 | 402 | 540 | 1372 |
| [3]701-1,500 | 75-89 | 125 | 218 | 251 | 327 | 839 |
| [4]1,501-3,500 | 87-95 | 154 | 112 | 131 | 186 | 361 |
| [5]3,501-6,000 | 77-95 | 297 | 108 | 209 | 268 | 365 |
| [6]6,001-10,000 | 75-90 | n/a[8] | n/a | n/a | n/a | 448 |
| [7]10001-14,000 | 68-80 | n/a | n/a | n/a | 209 | n/a |

[1]Celite FilterCel, Radiolite 200, Celatom FP1, Dicalite WB6, CECA Clarcel CBR
[2]Celite standard SuperCel, Radiolite 300, Celatom FP4, Dicalite 231, CECA Clarcel CBL3
[3]Celite Hyflo SuperCel, Radiolite 600, Celatom FW12, Dicalite 341, CECA Clarcel DIFBO
[4]Celite 535, Radiolite 900, Celatom FW40, Dicalite Speedex, CECA Clarcel DICS
[5]Celite 545, Radiolite 900S, Celatom FW60, Dicalite 2500, CECA Clarcel DITR
[6]CECA Clarcel DIT2R
[7]Dicalite 4500
[8]n/a—not available
[9]CECA filter aid product(s) now produced by Calgon Carbon The consumption-adjusted extractable metals factors for the high purity versions of the ultra-high performance filtration products/media and representative prior art products are shown in Table 11. Again, the CA-EMF shows very low levels for the present disclosure in comparison to other competitive acid washed products and the beneficiated purified Celpure products.

TABLE 11

Consumption-Adjusted Extractable Metals Factor (CA-EMF) (in ppm) of Exemplary High Purity, Ultra-High Performance Products/Media and the Prior Art Products

| Permeability Range (mD) | Present[1] Disclosure | Celite AW Grade | Celatom PurifiDE | Celpure Grades | Shiuh et al. (2001) |
|---|---|---|---|---|---|
| [1] 85-200 | 6-8 | n/a[5] | n/a | 13 | n/a |
| [2] 200-700 | 3-5 | 405 | 59 | 11 | n/a |
| [3] 701-1,500 | 4-6 | n/a | 51 | 7 | n/a |
| [4] 1,501-3,500 | 3-5 | 23 | 43 | n/a | n/a |
| 3,501-6,000 | 4-6 | n/a | n/a | n/a | n/a |
| 6,001-10,000 | 5-7 | n/a | n/a | n/a | n/a |
| 10001-13,000 | 5-8 | n/a | n/a | n/a | n/a |

[1] Celpure 100
[2] Celite Standard SuperCel, Celatom PurifiDE AW3, Celite Analytical Filter Aid, Celpure 300
[3] Celatom PurifiDE AW12, Celpure 1000
[4] Celite AW 535, Celatom PurifiDE AW20
[5] n/a—not available Manufacturing Process Several unique features of the manufacturing process for products of the present invention are associated with the selection of the ore used in manufacturing both ultra-high performance and ultra-high performance, ultra-high purity products. These include the selection of lacustrine diatomite ore possessing naturally low centrifuged wet densities, while also possessing relatively high levels of iron oxide and alumina impurities. In the prior art, marine diatomites possessing higher centrifuged wet densities and lower contents of alumina and iron oxide were selected as the raw materials.

One distinct feature of the manufacturing process of the ultra-high performance filtration products/media of this invention is the ability to produce highly permeable products/media up to 10,000 millidarcies by using a direct-run process (without the use of post-calcination classification). In the prior art, high permeability conventional products are manufactured by removing the finer particles in the calcined product in order to achieve an increase in the average particle size and the permeability of the product. In the present disclosure, the highly permeable products/media are made by the technique of wet kiln feed fluidization which enhances the agglomeration of the finer particles to the coarser particle in the kiln. The end result is a product/media that has significantly lower fines fraction, higher permeability and enhanced lower centrifuged wet density compared to the same operating conditions for comparable conventional products without any feed fluidization. Also, the present disclosure achieves the lowest extractable metals for the various products/media with the use of enhanced acid wash/pressure leach of the final product/media. Extractable metal impurities of the products/media of the present invention are therefore very low in comparison to the prior art products. Another unique aspect of the present disclosure is the ability to calcine the diatomite feed at extremely high temperatures without increasing the centrifuged wet density of the final product/media. There is a limitation on the calcination temperature of typical conventional diatomite products manufacturing since there is typically a significant increase in the product density at high calcination temperatures. Being able to calcine at a higher temperature without impacting the density of the product/media has the positive effect of fixing the soluble impurities, resulting in lower extractable metals.

Methods of Characterizing the Ultra-High Performance Diatomite Filtration Products/Media and the High Purity, Ultra-High Performance Diatomite Filtration Products/Media The methods of characterizing the ultra-high performance filtration products/media and the high purity ultra-high performance filtration products/media of the present invention, as well as other comparative diatomaceous earth products, are described in detail in the sections below.

Permeability

The permeability of a filter cake (that contains diatomaceous earth) is an important measure of the cake's capability for filtration and it is determined experimentally by observing the rate of flow of tap water under a defined pressure differential at room temperature. It is an important characteristic which is used for the product specification, together with wet density, particle size distribution, solids retention and other physical and chemical properties. Filtration using filter cakes containing diatomaceous earth is used for the removal of particulate solids from fluids in industrial processes and the permeability of the filtration cake generally dictates the level of particulate removal efficiency and the flux rate of the fluid that flows through the cake. The current invention therefore provides characterization of the various low extractable, high performance products/media based on the permeabilities of the products/media. The current invention provides characterization of the various products based on the permeabilities of the products as opposed to the typical characterization based on the broad classification of non-calcined, straight-calcined and flux-calcined (each a product category), which does not effectively indicate the unique properties of the product permeability ranges as determined in this invention. The permeability ranges for each product category is shown in Table 12 below.

TABLE 12

Permeability Ranges for Various Product Categories

| Product Category | Permeability Range (millidarcy) |
|---|---|
| Lightly flux-calcined | 85-200 |
| Flux-calcined, direct-run | 201-700 |
| Flux-calcined, direct-run | 701-1,500 |
| Flux-calcined, direct-run | 1,501-3,500 |
| Flux-calcined, direct-run | 3,501-6,000 |
| Flux-calcined, direct-run | 6,001-10,000 |
| Flux-calcined, classified | 10,001-14,000 |

Permeability measurements of the filter cake samples described herein were performed using either the VEL Permeameter method (Analitika—EBC 1985), for products of 700 millidarcies or the Celatom Permeameter method disclosed in U.S. Pat. No. 5,878,374, for products greater than 700 millidarcies to 14,000 millidarcies.

The VEL Permeameter method uses a measuring device that is in the form of a cylindrical tube with a pressure gauge and a septum. The filter aid powder to be tested is weighed into a beaker and 450 ml tap water is added to suspend the material in slurry form. A Whatman® #4 filter paper is placed on the septum of the device and the tube is then bolted down to ensure no leakages. Using a glass rod, the slurry is poured into the tube, the top closed and the required air pressure is applied to cause the flow of the liquid into a graduated cylinder. A filter cake will form on the filter paper as the liquid is filtered; the air pressure is shut off when about 1 cm of liquid is left on top of the cake. The top is opened and the collected water is gently poured back into the tube, ensuring that the cake is not disturbed. After a five-minute waiting period, the pressure is again applied at the required set-point and a timed volume of liquid, 100-300 ml is collected. The rest of the liquid is allowed to drain from the tube to obtain a dry cake. The dewatered cake is removed and the thickness is measured. The filtrate temperature is also measured and the corresponding viscosity of the water is obtained. The permeability ($\beta$) of the cake in millidarcy is then calculated as:

$$\beta = \frac{101.3\,(kPa) * V(cm^3) * h\,(cm) * \eta\,(mPa.s)}{A\,(cm^2) * \Delta P\,(kPa) * t\,(sec)} * 1000$$

Where,
V=a constant of 200 cm$^3$; this is the volume of timed liquid
A=a constant of 20.22 cm$^2$; this is the filtration area of the VEL tube
$\Delta P$=applied pressure–50 kPa or 200 kPa depending on whether the material has slow or fast flow rate
h=height of filter cake formed in cm (may vary depending on the wet bulk density of the material)
$\eta$=viscosity of water in mPa·s (milliPascals·seconds)

Table 13 below gives the test parameters used for different permeability ranges of the filter aid material to be tested.

TABLE 13

VEL Permeameter Test Conditions

| Product Category | Flux Calcined | Calcined | Calcined & Naturals | Units |
| --- | --- | --- | --- | --- |
| Permeability | >500 | 50-500 | <50 | mDarcy |
| Sample Weight | 40 | 20 | 10 | g |
| Test Pressure | 50 (7.25 PSI) | 200 (29 PSI) | 200 (29 PSI) | kPa |

The Celatom Permeameter is an automated instrument that forms a "filter cake" from a diatomite sample of known mass and then measures all required parameters needed to calculate permeability and wet bulk density, using tap water at room temperature as the test fluid. The equations for calculating wet bulk density ($\rho$) in g/ml and permeability (($\beta$) in millidarcy are listed below:

$$\rho = \frac{m}{h*A}$$

$$\beta = \frac{V*h*\eta}{A*\Delta P*t} * 1000$$

Where:
A=cross-sectional area of the cake (cm$^2$)
$\Delta P$=pressure drop across the cake (atm.)
t=time of flow (s)
m=dry sample mass (g)
$\eta$=filtrate viscosity (cp)
V=filtrate volume (ml)
h=cake height (cm)

It is easier to produce higher permeability products from ores that have not been beneficiated by either minerals processing techniques, such as flotation or by acid washing prior to calcining than from ores that have been processed to remove or reduce the fluxing impurities that can naturally occur with crude ores. Removing these impurities during a beneficiation or acid washing process produces a kiln feed that is more difficult to agglomerate through thermal processing. However, fast products can be produced from beneficiated ores by removing the finer particle from the calcined material. Classifying out (removing) the fines fraction tends to result in a denser product due to the attrition in the classifying machine. One of the novel aspects of this invention is the ability to make direct-run very fast flow rate highly permeable products with a permeability of as high as 10,000 millidarcies Bulk Chemistry Diatomaceous earth contains primarily the skeletal remains of diatoms and includes primarily silica, along with some minor amounts of impurities like magnesium, calcium, sodium, aluminum, and iron. The percentages of the various elements may vary depending on the source of the diatomaceous earth deposit. The biogenic silica found in diatomaceous earth is in the form of hydrated amorphous silica minerals which are generally considered to be a variety of opal with a variable amount of hydrated water (Enrico et al., 1948). Other minor silica sources in diatomaceous earth may come from finely disseminated quartz, chert and sand. These minor silica sources however do not have the intricate and porous structure of the biogenic diatom silica species.

The bulk chemistry of diatomaceous earth ores and products, in most cases, have an important impact on the quality of the products made from the ores, and, in general, impacts the extractable metals properties of the filter aid product. XRF (X-ray fluorescence) spectroscopy is widely accepted as the analytical method of choice for determining the bulk chemistry of diatomaceous earth material and it is a non-destructive analytical technique used to determine the elemental composition of materials. XRF analyzers determine the chemistry of a sample by producing a set of characteristic fluorescent X-rays that is unique for that specific element, which is why XRF spectroscopy is an excellent technology for qualitative and quantitative analysis of material composition. In the testing of the bulk chemistry of the diatomaceous earth materials reported herein, 5 g dried powdered sample together with 1 g of X-ray mix powder binder are finely milled in a Spex® mill and then pressed into a pellet. The pellet is loaded into an automated Wavelength Dispersive (WD) XRF equipment, which has been previously calibrated with diatomaceous earth reference averages, to determine the bulk chemistry. To accommodate the natural loss of hydration within the silica structure, the total mineral contents for all the examples are reported on the Loss-on-Ignition (LOI) or on ignited basis for their respective high oxides. As used herein, "on ignited basis" means the mineral oxide content measured without the influence of the water of hydration within the silica structure. The results of the chemistry of the ultra-high purity products and other competitive materials are herein presented in the Examples section.

Quantification of Opal and Cristobalite

Thermal processing of the diatomaceous earth ore to generate higher permeability straight-calcined and flux-calcined products results in sintering and agglomeration of the particles with the effect of dehydrating the opaline structure of the products. Opal-A, which is the most common form of opal in natural, unprocessed diatomaceous earth, can convert to Opal-CT and/or Opal-C during the thermal treatment, and if subjected to further heat or higher temperatures, to the cristobalite mineral phase. Under some conditions, the Opal phases can convert to quartz and cristobalite, crystalline forms of silica that do not contain any hydrated water. It is to be noted that the intricate and porous structure of the diatomaceous earth can be maintained in products that contain crystalline forms of silicon dioxide, but such products may also contain some unstructured, melted silicon dioxide in the form of crystalline silica.

To determine whether a sample of diatomite product contains cristobalite or opal-C (and/or opal-CT) then to quantify the opal-C (and/or opal-CT) and/or crystalline silica content involves a number of steps according to the method referred to as the "LH Method."

First, it is determined whether the sample contains water of hydration via high temperature loss on ignition (LOI) testing. A representative portion (referred to herein as a "split") of the sample (previously dried) is obtained and loss on ignition testing is performed on this (first) split (i.e. ASTM C571). If the LOI is <0.1%, then the phases present are not opaline. If it is >0.1%, opaline phases may be present.

Second, bulk powder X-ray Diffraction (XRD) is performed, and a resulting (first) diffraction pattern inspected. Another representative split (dry) of the sample is milled prior to XRD. The milled (second) split should be at least 99% minus 400 mesh (37 um) prior to XRD. The resulting diffraction pattern of the milled second split is analyzed for the presence or absence of opal-C (and/or opal-CT) and cristobalite. The diffraction pattern may also be analyzed for the presence or absence of other crystalline silica phases (for example, quartz and tridymite). As discussed, the opal-C (and/or opal-CT) diffraction pattern differs from that of α-cristobalite in the following ways: the primary peak (22°) and the secondary peak (36°) are at higher d-spacing (4.06 to 4.11 for the primary peak as opposed to 4.02 to 4.04 for well-ordered cristobalite), there is a broader primary peak for opal-C (and/or opal-CT) as measured using the "Full Width at Half Maximum" (FWHM) statistic (usually >0.35), opal-C (and/or opal-CT) has poorly-defined peaks at 31.50° and 28.49° 2θ, and a much more significant amorphous background.

Figure 5:
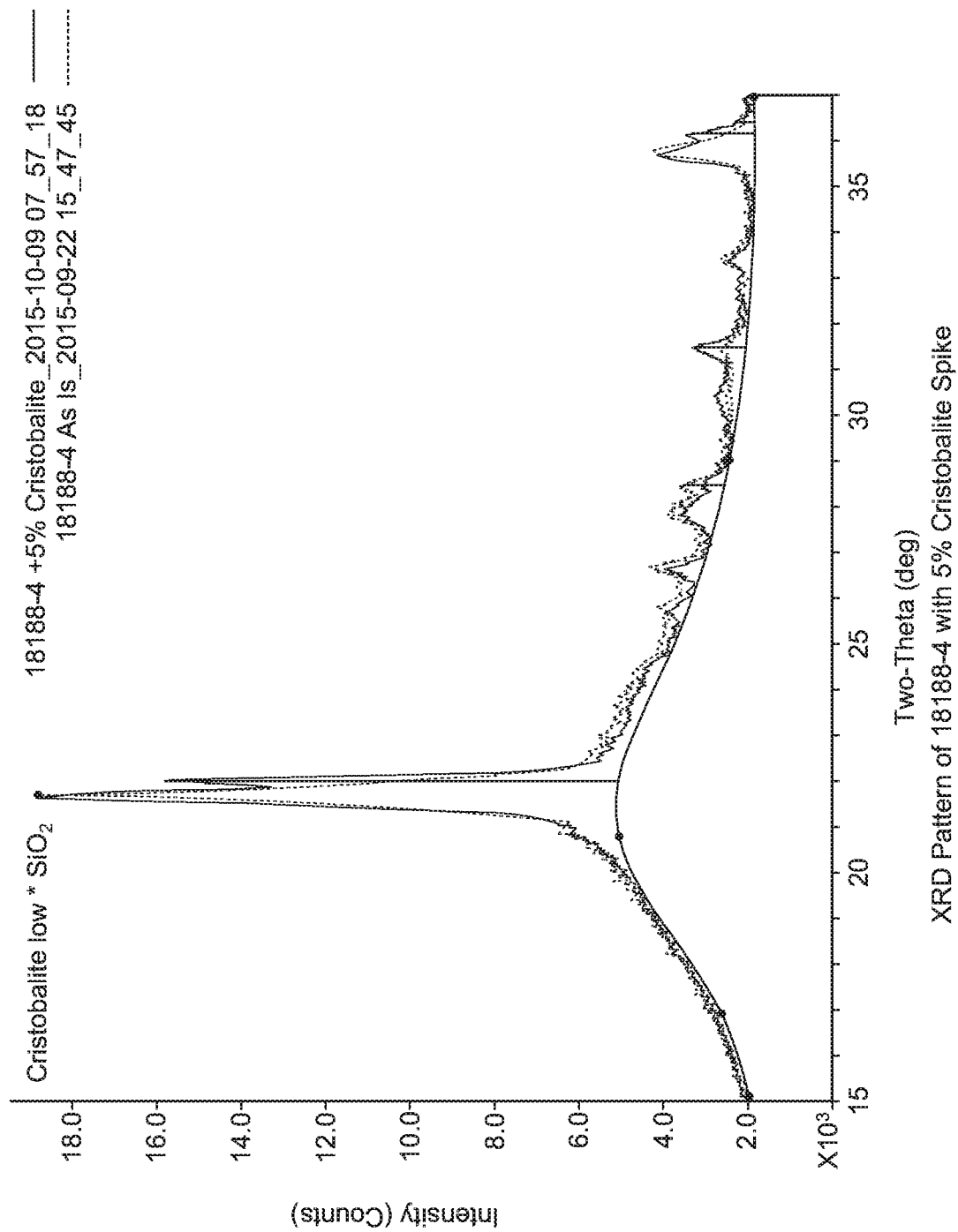
FIG. 5 illustrates flux-calcined diatomaceous earth with and without 5% 1879a spike showing Opal-C.
Figure 6:
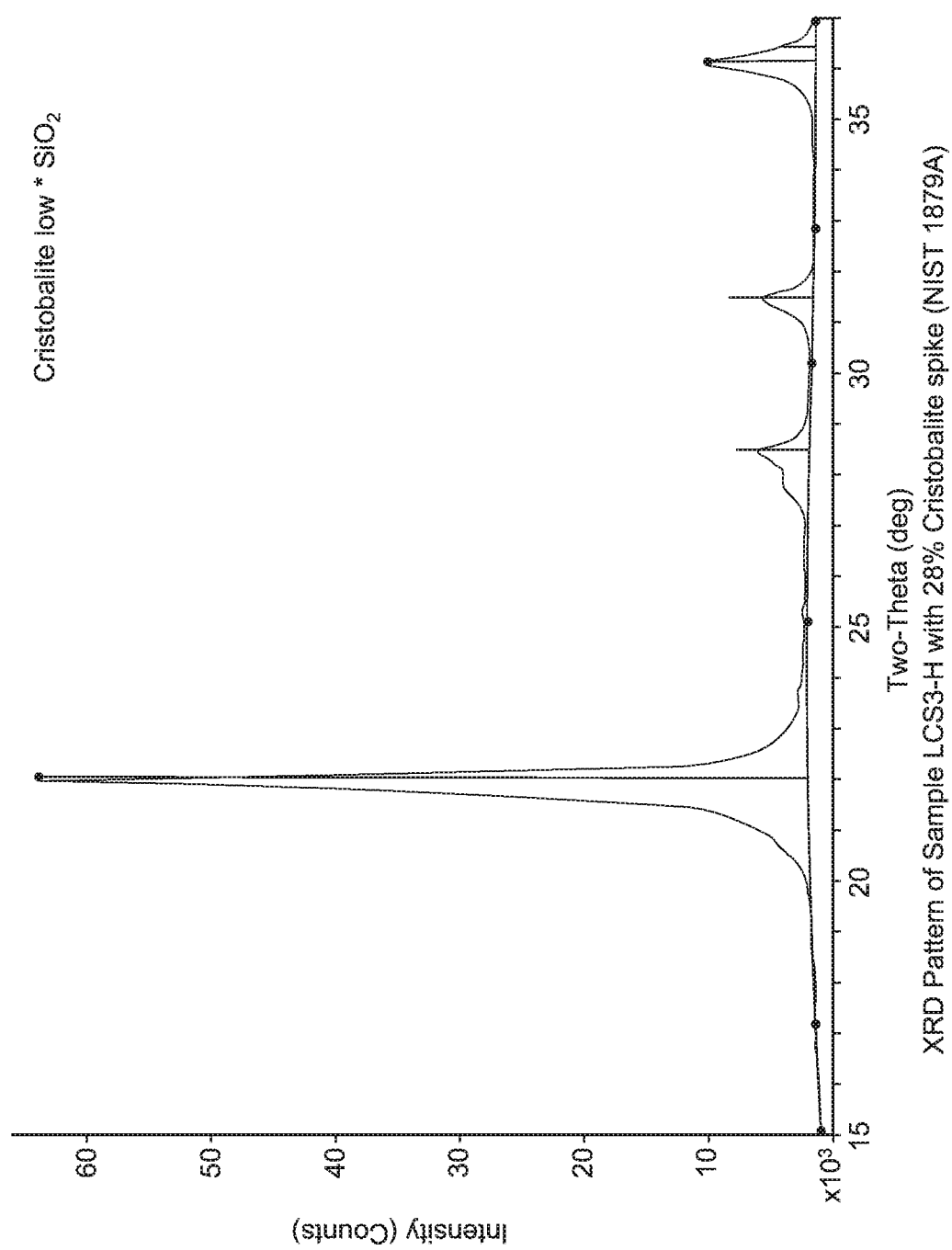
FIG. 6 illustrates flux-calcined diatomaceous earth with 28% 1879a spike showing cristobalite.

If the diffraction pattern is questionable with regard to whether opal-C (and/or opal-CT) and/or cristobalite is present, then according to the LH Method a second XRD analysis is performed to determine whether opal-C (and/or opal-CT) and/or cristobalite is present. This time the analysis is performed on another representative portion of the sample spiked with cristobalite standard reference material (NIST 1879a). A (representative) third split of the sample is obtained and then spiked with cristobalite standard reference material (NIST 1879A). After co-milling and dispersion of the standard within the spiked third split, XRD is performed on the (spiked) third split. The resulting diffraction pattern is analyzed. If the original sample (the second split) comprises opal-C (and/or opal-CT), the cristobalite spike added to the third split significantly modifies the original diffraction pattern with additional peaks identifiable at 22.02° and 36.17° 2θ, along with more prominent peaks at 31.50° and 28.49° 2θ. If the original sample (the second split) comprises cristobalite, then addition of the cristobalite spike to the third split only results in increased peak intensity and no other significant change from the first diffraction pattern. FIGS. 5 and 6 show the diffraction patterns of spiked samples. FIG. 5 shows the pattern of a sample comprising opal-C (and/or opal-CT), and FIG. 6 shows the pattern of a sample comprising cristobalite.

Quantifying the opal-C (and/or opal-CT) content of a diatomite sample can be complicated as its diffraction pattern is a combination of broad peaks and amorphous background, and diatomite products often contain other x-ray amorphous phases in addition to opal. According to the LH Method, an estimate of the quantity is obtained by treating the opal-C peaks of the first diffraction pattern as if they are cristobalite and quantifying against cristobalite standards such as NIST 1879a. This method of quantification of opal-C (and/or opal-CT), which we call the XRD Method, will usually underestimate the opal-C (and/or opal-CT) content but is effective for a number of purposes, such as manufacturing quality control. Alternatively, a measure may be obtained by heating a representative split of the sample at very high temperature (e.g., 1050° C.) for an extended period of 24 to 48 hours until that heated portion is fully dehydrated. This completely dehydrates opaline phases and forms cristobalite (reduces amorphous background component). XRD analysis is then performed on the dehydrated split and the cristobalite in the resulting diffraction pattern can be quantified against the cristobalite standards to give an estimate of original opal-C (and/or opal-CT) content. As long as additional flux is not added prior to heating the selected split, and the temperature is kept below 1400° C., any quartz present in the sample split will not be converted to cristobalite.

If it is determined by the LH Method that cristobalite is present, the cristobalite seen in the (first) diffraction pattern may be compared to its respective standard (for example NIST 1879a) for quantification of the content, or be quantified through the use of an internal standard (such as corundum) and applicable relative intensity ratios. In the case where there is both opal-C (or opal-CT) and cristobalite present and the primary peak of the opal-C (or opal-CT) cannot be differentiated or de-convoluted from that of cristobalite, the opal-C (or opal-CT) and cristobalite are quantified as one phase and reported as cristobalite. The quantity of cristobalite thus reported will be higher than the actual quantity in the sample.

Bulk powder XRD equipment and instrumental parameters are not expressly fixed, but should provide good resolution and sufficient counts for quantification. EP Minerals' internal analyses are performed using a Siemens® D5000 diffractometer controlled with MDITM Datascan5 software, with CuKα radiation, sample spinning, graphite monochromator, and scintillation detector. Power settings were at 50 KV and 36 mA, with step size at 0.04° and 4 seconds per step. JADE™ (2010) software was used for analyses of XRD scans. Sample preparation included SPEX® milling in zirconia vials with zirconia grinding media.

XRD results of the ultra-high performance products and the high purity, ultra-high performance products indicated that all the products have a combined opal-A and opal-C (and/or opal-CT) content of 98 wt % with no presence of cristobalite. No presence of cristobalite means 0 wt % cristobalite or a non-detectable (nd) amount.

Centrifuged Wet Density

The wet density of a diatomaceous earth crude ore or product is a measure of the void volume available for capturing particulate matter during a filtration process. Wet densities are often correlated with unit consumption of diatomite filtration media. In other words, a diatomite filtration media possessing a low centrifuged wet density often provides for low unit consumption of the diatomite product in filtration operations.

Several methods have been used to characterize the wet density of diatomite filtration media products. The method used in this invention is the centrifuged wet density (CWD).

This test method has been used frequently in the patent prior art, such as in U.S. Pat. No. 6,464,770 (Palm et al. (2002)). In this test method, 10 ml of deionized water is first added to a 15 ml graduated centrifuge glass tube and 1 g of dry powder sample is loaded into the tube. The sample is completely dispersed in the water using a vortex-genie 2 shaker. A few milliliters of deionized water is then used to rinse the sides of the tube to ensure all particles are in suspension and the contents brought up to the 15 milliliters mark. The tube is centrifuged for 5 min at 2680 rpm and the volume of the settled solids noted by reading off at the graduated mark. The centrifuge wet density is determined as weight of the sample divided by the volume in g/ml. A conversion factor of 62.428 is applied to obtain the centrifuged wet density in $lb/ft^3$.

Silica Specific Volume

Silica specific volume is calculated as follows:

$$\text{Silica Specific Volume} = \frac{\text{Fraction Silica Content}}{\text{Centrifuged Wet Density}}$$

Where:

Fraction Silica Content=percentage $SiO_2$ content in the diatomite divided by 100

Centrifuged Wet Density=grams per milliliter of solids (g/ml)

It is apparent from the equation that a product with high silica content and low centrifuged wet density will result in a high silica specific volume.

Extractable Metals Factor (EMF) and Extractable Metals Test Methods

As mentioned above, in many applications, it is preferable for diatomite filtration media to have low levels of extractable impurities because extractables are compounds that can migrate from the filter aid material into the liquid product.

The major bulk impurities in diatomaceous earth products are aluminum, iron and calcium and they also form the major extractable metals when the filter aid comes into contact with a fluid. To quantify the contribution of these metals to the extractables, it is prudent to determine the total of these metals in the fluid, which is represented by the Extractable Metals Factor (EMF):

Extractable Metals Factor=Σ(Al,Fe,Ca)

Where:

Al, Fe, Ca are the soluble metals in mg per kg of diatomaceous earth product, using the European Brewery Convention (EBC) test method.

In other words, the EMF is a measure of the sum of the extractable aluminum, iron and calcium contained in a standard mass of the product/media under conditions specified by the European Brewing Convention (EBC) for the measurement of extractable iron. The relationship indicates that a higher quality filter aid product, from a purity stand point, will have a lower extractible metals index.

The Consumption-Adjusted Extractable Metals Factor (CA-EMF) is the centrifuged wet density of a filter aid (or media) divided by the centrifuged wet density of a typical (or standard) DE filter aid (or media) multiplied by the Extractable Metals Factor for the filter aid (FA) (or media). For example, consumption-adjusted extractable metals factor for the lower density product of this disclosure is given as:

$$\text{Consumption-Adjusted } EMF = \frac{CWD \text{ of low density filter aid}}{CWD \text{ of Standard } DE \text{ Filter aid}} \times (EMF \text{ of low density } FA)$$

CWD of standard DE filter-aid was considered as 21 $lb/ft^3$ (or 0.336 g/ml).

It is important to recognize that results from less rigorous test methods may underrepresented the actual levels and extent of extractables, and that the use of more rigorous method is the most preferred way of determining the quality of a filter aid. The EBC method employed in the analysis of samples in this invention represents a more rigorous test as compared to a controlled extraction test, utilizing relevant model solvent systems such as sodium acetate buffer. The EBC extraction test method is also more rigorous than the American Society of Brewing Chemists (ASBC) extraction test method that uses beer as the extracting agent.

The European Brewery Convention (EBC) has established a compendium of accepted test methods, including a test method to determine the soluble metal contribution of filter media to filtrate. The EBC soluble metals test comprises suspending a representative sample (2.5% slurry concentration) of the media/product to be tested for two hours at ambient temperature in a 1% solution of potassium hydrogen phthalate (pH of 4), filtering the suspension, and then analyzing the filtrate of the sample solution for iron (Fe), calcium (Ca), aluminum (Al) and arsenic (As) contents using Inductively Coupled Plasma (ICP) spectrophotometers or Graphite Furnace Atomic Absorption (GFAA). The choice of using ICP or GFAA is based on the limit-of-detection (LD) of the element to be measured. The ICP instrument used in this analysis was of the Atomic Emission Spectrometry (AES) type. It uses the intensity of light emitted from a flame at a particular wavelength to determine the quantity of an element in a sample. The wavelength of the atomic spectral line gives the identity of the element while the intensity of the emitted light is proportional to the number of atoms of the element. The sample analyte is introduced into the flame as sprayed solution. The heat from the flame evaporates the solvent and breaks chemical bonds to create free atoms. The thermal energy also excites the atoms that subsequently emit light. Each element emits light at a characteristic wavelength, which is dispersed by a grating or prism and detected in the spectrometer.

GFAA, also known as electrothermal atomization (ETA), is a technique for improving the sensitivity and limit-of-detection for atomic absorption measurements. In this test, a small amount of the filtrate of the sample solution is placed inside a hollow graphite tube. This is resistively-heated in a temperature program to burn off impurities, atomize the analyte to form a plume of free metal vapor, and finally clean the tube. The free atoms will absorb light at frequencies or wavelengths characteristic of the element of interest (hence the name atomic absorption spectrometry). Within certain limits, the amount of light absorbed can be linearly correlated to the concentration of analyte present.

A reliable test method for the determination of soluble metals from diatomaceous earth products in beer has been established in the industry (American Society of Brewing Chemist, 1987). The Graphite Furnace Atomic Absorption (GFAA) spectroscopy was used in the final determination of the concentration of soluble iron, aluminum and calcium in beer in the present invention. In the test, 2.5 g of dried product was added to 100 ml of carbonated BUDWEISER® beer at room temperature in 250 ml Erlenmeyer flask and made to suspend by swirling. The flask was swirled again at 1, 2, 3, 4, and 5 minutes of elapsed time. For the last time, the flash was swirled again at 5 minutes and 50 seconds, and the entire content was immediately transferred to a funnel fitted with filter paper. The filtrate collected during the first 30 seconds was discarded and the test filtrate sample was then collected during the next 2 minutes and 30 seconds for a total elapsed time of 9 minutes for the extraction.

A set of iron, aluminum and calcium standards were prepared in the decarbonated beer and using beer as the blank, the standards were used to calibrate the spectrometer. The sample filtrates were then ran to determine the concentration of the extractable metals in solution. The concentration of metal in beer was then calculated as:

Beer Soluble Metal (ppm)=(Metal (ppm) from ICP or GFAA)×Dilution Factor×40

Results from all the different products of the ultra-high purity products/media of the present invention gave a concentration of less than 0.1 ppm (or 0.1 mg/kg) for each of iron, aluminum and calcium, below the detection limit of the test.

Optical Properties

The optical properties of the powder were characterized by using the color space defined by the Commission Internationale de l'Eclairage (CIE), as the L*a*b* color space. The L* coordinate represents brightness and is a measure of reflected light intensity (0 to 100), the a* coordinate represents values showing color variation between green (negative value) and red (positive value), whereas the b* coordinate represents values showing color variation between blue (negative value) and yellow (positive value). A Konica Minolta® Chroma-meter CR-400 was used to measure the optical properties of samples described herein.

A dry representative sample (approximately 2 g or enough to cover the measuring tip of the meter) was taken and ground using a mortar and pestle. The resulting ground powder was spread on white paper and pressed with a flat surface to form a packed smooth powder surface. The Chroma Meter was pressed on the powder and the readings were noted. The results of the optical tests for various ultra-high performance products are shown in the ensuing product examples.

EXAMPLES

Various product examples of the ultra-high performance diatomite products/media of the present disclosure are given below, showing individual products covering permeabilities of 85 millidarcies to 14,000 millidarcies. These examples are offered by way of illustration and not by way of limitation.

Methods of Preparing the Ultra-High Performance Diatomite Products/Media (not Acid Washed Versions)

The crude ore was dried and hammer-milled to pass 80 mesh size. A sample of the powder passing 80 mesh was then subjected to a centrifuged wet density test to determine if the density was in the range of 0.144 g/ml (9.0 lb/ft3) to 0.240 g/ml (15 lb/ft$^3$), to be accepted as the ore for preparing the feed for the process. The standard operating procedure for carrying out the centrifuged wet density test is described herein under the "Methods of Characterizing the Ultra-high Performance Diatomite Filtration Products/Media and the High Purity, Ultra-high Performance Diatomite Filtration Products/Media" section of this disclosure. The centrifuged wet density of the feed material used in preparing the ultra-high performance products/media (not acid washed versions) in this disclosure was 0.176 g/ml (11.0 lb/ft$^3$). The milled material was then classified with the use of a mechanical air classifier to separate heavy mineral impurities such as quartz, chert, and sand. The separator product/media was thoroughly blended with soda ash and then wetted with atomized water to reduce the loose weight density of the calcination feed (wet kiln feed fluidization). The material was calcined in the muffle furnace at a given temperature and the product/media was cooled and dispersed through a Tyler mesh screen. The process conditions for the calcination of the various products/media are given in Table 14 below.

TABLE 14

Process conditions for preparing Exemplary 85 millidarcies to 14,000 millidarcies (not acid washed) products/media

| Product | Calcination Temp. (° C.) | Calcination Time (min) | Soda Ash Addition (wt %) | Water Addition (wt %) | Fines Removal |
|---|---|---|---|---|---|
| Example 1 | 1093 | 45 | 0.5-0.7 | 0 | No |
| Example 2 | 1150 | 45 | 1.5-3.0 | 0 | No |
| Exampl3 3 | 1150 | 45 | 2.0-3.0 | 3 | No |
| Example 4 | 1150 | 45 | 4.0-6.0 | 6 | No |
| Example 5 | 1150 | 45 | 6.0-7.0 | 6 | No |
| Example 6 | 1150 | 45 | 7.0-8.0 | 6 | No |
| Example 7 | 1150 | 45 | 7.0-8.0 | 6 | Yes |

Example 1

Exemplary Ultra-High Performance (not Acid Washed) Products/Media

The properties of exemplary products obtained with 0.75% soda ash addition to the feed and calcining at 1093° C. to obtain ultra-high filtration performance products/media are shown in Table 15. The centrifuged wet density of about 0.172 g/ml (10.7 lb/ft$^3$) for both product examples is extremely low for these slow products/media with permeability of about 89 millidarcies to about 143 millidarcies. The lower density provides for a low consumption-adjusted beer soluble iron and extractable metals factor, which is also very low for such products/media. The high silica specific volume is also exceptional for these products/media.

TABLE 15

Exemplary Products/Media of the Present Invention

|  | Example A | Example B |
|---|---|---|
| [1]Perm | 143 | 89 |
| SiO$_2$ (wt %) | 89.42 | 89.57 |
| Al$_2$O$_3$ (wt %) | 4.57 | 4.76 |
| Fe$_2$O$_3$ (wt %) | 4.03 | 4.08 |
| Na$_2$CO$_3$ (wt %) | 0.61 | 0.51 |
| [2]CWD (g/ml) | 0.172 | 0.170 |
| CWD (lb/ft$^3$) | 10.7 | 10.6 |
| [3]SSV | 5.2 | 5.3 |
| [4]CA-EMF (ppm) | 82 | 89 |
| [5]CA-BSFe (ppm) | 8 | 10 |
| Color [L*, b*] | [71.0, 20.0] | [70.9, 20.0] |

[1]Permeability of Product - millidarcies
[2]Centrifuged Wet Density (CWD)
[3]Silica Specific Volume (SSV)
[4]Consumption-adjusted Extractable Metals Factor (EBC test method)
[5]Consumption-adjusted beer soluble iron (ASBC test method)

Example 2

Exemplary Ultra-High Performance (not Acid Washed) Products/Media

Table 16 shows the properties of two examples of the ultra-high performance product/media (not acid washed) prepared with 1.5% and 3.0% soda ash and 1150° C. calcination temperature of the present invention with permeabilities of 271 millidarcies and 481 millidarcies. The maximum centrifuged wet density of only 0.152 g/ml (9.5 lb/ft$^3$) is lower than that of any product of the prior art and any commercially available product of this product category. The silica specific volume of about 6 is exceptionally high for these products/media. The consumption-adjusted beer soluble iron of only 5 ppm and 12 ppm are very low for these non-purified diatomite products/media. Similar low extractable metals factor is indicated for the two product examples.

TABLE 16

Exemplary Products Media of the Present Invention

|  | Example A | Example B |
|---|---|---|
| [1]Perm | 271 | 481 |
| SiO$_2$ (wt %) | 89.23 | 89.61 |
| Al$_2$O$_3$ (wt %) | 4.20 | 4.50 |
| Fe$_2$O$_3$ (wt %) | 3.97 | 3.93 |
| Na$_2$CO$_3$ (wt %) | 1.5 | 3.0 |
| [2]CWD (g/ml) | 0.152 | 0.147 |
| CWD (lb/ft$^3$) | 9.5 | 9.2 |
| [3]SSV | 5.9 | 6.1 |
| [4]CA-EMF (ppm) | 76 | 83 |
| [5]CA-BSFe (ppm) | 5 | 12 |
| Color [L*, b*] | [71.0, 19.6] | [71.0, 19.8] |

[1]Permeability of Product - millidarcies
[2]Centrifuged Wet Density (CWD)
[3]Silica Specific Volume (SSV)
[4]Consumption-adjusted Extractable metals factor (EBC test method)
[5]Consumption-adjusted beer soluble iron (ASBC test method)

Example 3

Exemplary Ultra-High Performance (not Acid Washed) Products/Media

Physical and chemical properties of two exemplary products/media of the present disclosure are shown in Table 17. The average centrifuged wet density of about 0.176 g/ml (11.0 lb/ft$^3$) is the lowest for these (not-acid washed) products/media. The beer soluble iron of 10 ppm and lower are very low for these products/media. The low L* values and the high b* values indicate the absence of cristobalite in these high permeability products/media.

TABLE 17

Exemplary Ultra-High Performance (Not Acid Washed) Products/Media of the Present Invention

|  | Example A | Example B |
|---|---|---|
| [1]Perm | 870 | 1289 |
| SiO$_2$ (wt %) | 88.89 | 89.03 |
| Al$_2$O$_3$ (wt %) | 4.05 | 4.05 |
| Fe$_2$O$_3$ (wt %) | 3.95 | 3.83 |
| Na$_2$CO$_3$ (wt %) | 2.0 | 3.0 |
| [2]CWD (g/ml) | 0.172 | 0.184 |
| CWD (lb/ft$^3$) | 10.7 | 11.5 |
| [3]SSV | 5.2 | 4.8 |
| [4]CA-EMF (ppm) | 75 | 91 |
| [5]CA-BSFe (ppm) | 10 | 8 |
| Color [L*, b*] | 70.7, 19.5 | 70.8, 19.9 |

[1]Permeability of Product - millidarcies
[2]Centrifuged Wet Density (CWD)
[3]Silica Specific Volume (SSV)
[4]Consumption-adjusted Extractable metals factor (EBC test method)
[5]Consumption-adjusted beer soluble iron (ASBC test method)

Example 4

Exemplary Ultra-High Performance (not Acid Washed) Products/Media

Physical and chemical properties of two exemplary products/media of the present disclosure are shown in Table 18, using 4.0 wt % and 6.0 wt % soda ash in the products' preparation. The centrifuged wet density for the two product examples below 0.172 g/ml (11.0 lb/ft$^3$) with the resulting high silica specific. The low density provides for a consumption-adjusted beer soluble iron of less than 10 ppm and consumption-adjusted extractable metals factor of less than 100. The color values also show that these flux-calcined products/media are cristobalite-free.

TABLE 18

Exemplary ultra-high performance (Not Acid Washed) Products/Media of the Present Invention

|  | Example A | Example B |
|---|---|---|
| Permeability (mD) | 2465 | 3357 |
| SiO$_2$ (wt %) | 85.66 | 86.79 |
| Al$_2$O$_3$ (wt %) | 4.79 | 4.67 |
| Fe$_2$O$_3$ (wt %) | 4.36 | 4.13 |
| Na$_2$CO$_3$ (wt %) | 4.0 | 6.0 |
| [1]CWD (g/ml) | 0.168 | 0.172 |
| CWD (lb/ft$^3$) | 10.5 | 10.7 |
| [2]SSV | 5.1 | 5.0 |
| [3]CA-EMF (ppm) | 87 | 92 |
| [4]CA-BSFe (ppm) | 9 | 8 |
| Color [L*, b*] | 72.8, 19.2 | 72.5, 19.7 |

[1]Centrifuged Wet Density (CWD)
[2]Silica Specific Volume (SSV)
[3]Consumption-adjusted Extractable metals factor (EBC test method)
[4]Consumption-adjusted beer soluble iron (ASBC test method)

Example 5

Exemplary Ultra-High Performance (not Acid Washed) Products/Media

The properties of some exemplary (not acid washed) products/media are shown in Table 19 below. These products/media were prepared using 6.0 wt % and 7.0 wt % soda ash and calcining at 1150° C. temperature, resulting in product permeabilities of 4243 millidarcies and 5694 millidarcies. The centrifuged wet density of the product examples are extremely low for these products/media. The average centrifuged wet density of about 0.166 g/ml (10.4 lb/ft$^3$) provides for very high silica specific. Extractable metals factor is below 100 for both product examples.

TABLE 19

Exemplary (not acid washed) Products/Media of the Present Invention

|  | Example A | Example B |
|---|---|---|
| [1]Perm | 4243 | 5694 |
| SiO$_2$ (wt %) | 85.07 | 85.23 |
| Al$_2$O$_3$ (wt %) | 4.80 | 4.67 |
| Fe$_2$O$_3$ (wt %) | 4.41 | 4.34 |
| Na$_2$CO$_3$ (wt %) | 6.0 | 7.0 |
| [2]CWD (g/ml) | 0.165 | 0.167 |
| CWD (lb/ft$^3$) | 10.3 | 10.4 |
| [3]SSV | 5.2 | 5.1 |
| [4]CA-EMF (ppm) | 77 | 78 |
| [5]CA-BSFe (ppm) | 11 | 10 |
| Color [L*, b*] | [73.0, 19.1] | [73.0, 19.3] |

[1]Permeability of Product - millidarcies
[2]Centrifuged Wet Density (CWD)
[3]Silica Specific Volume (SSV)
[4]Consumption-adjusted Extractable metals factor (EBC test method)
[5]Consumption-adjusted beer soluble iron (ASBC test method)

Example 6

Exemplary Ultra-High Performance (not Acid Washed) Products/Media

The properties of some exemplary ultra-high performance (not acid washed) diatomite products/media are shown in Table 20 below. The exemplary products/media of 7141 millidarcies and 9345 millidarcies were produced by a direct-run process, using 7 wt % and 8 wt % soda ash. These products/media have very low centrifuged wet densities of less than 0.160 g/ml (10 lb/ft$^3$). The silica specific volume for these products/media is about 5.7, which is exceptionally high.

TABLE 20

Exemplary (not acid washed) Products/Media of the Present Invention

|  | Example A | Example B |
|---|---|---|
| [1]Perm | 7141 | 9345 |
| SiO$_2$ (wt %) | 84.97 | 89.57 |
| Al$_2$O$_3$ (wt %) | 4.63 | 4.71 |
| Fe$_2$O$_3$ (wt %) | 4.34 | 4.05 |
| Na$_2$CO$_3$ (wt %) | 7.0 | 8.0 |
| [2]CWD (g/ml) | 0.152 | 0.157 |
| CWD (lb/ft$^3$) | 9.5 | 9.8 |
| [3]SSV | 5.6 | 5.7 |
| [4]CA-EMF (ppm) | 75 | 80 |
| [5]CA-BSFe (ppm) | 12 | 12 |
| Color [L*, b*] | [73.1, 16.5] | [73.2, 165] |

[1]Permeability of Product - millidarcies
[2]Centrifuged Wet Density (CWD)
[3]Silica Specific Volume (SSV)
[4]Consumption-adjusted Extractable metals factor (EBC test method)
[5]Consumption-adjusted beer soluble iron (ASBC test method)

Example 7

Exemplary Ultra-High Performance (not Acid Washed) Products/Media

Table 21 shows the properties of exemplary ultra-high performance (not acid washed) diatomite product/media with centrifuged wet density of about 0.160 g/ml (10.0 lb/ft$^3$). These are the only products/media of this disclosure where fines were classified from the calcined product in achieving the target permeability.

TABLE 21

Exemplary (Not Acid Washed) Products/Media

|  | Example A | Example B |
|---|---|---|
| [1]Perm | 10,521 | 13,744 |
| SiO$_2$ (wt %) | 85.25 | 84.97 |
| Al$_2$O$_3$ (wt %) | 4.52 | 4.64 |
| Fe$_2$O$_3$ (wt %) | 4.21 | 4.36 |
| Na$_2$CO$_3$ (wt %) | 7.0 | 8.0 |
| [2]CWD (g/ml) | 0.164 | 0.160 |
| CWD (lb/ft$^3$) | 10.2 | 10.0 |
| [3]SSV | 5.2 | 5.3 |
| [4]CA-EMF (ppm) | 68 | 76 |
| [5]CA-BSFe (ppm) | 11 | 10 |
| Color [L*, b*] | 73.3, 15.4 | 73.1, 15.5 |

[1]Permeability of Product - millidarcies
[2]Centrifuged Wet Density (CWD)
[3]Silica Specific Volume (SSV)
[4]Consumption-adjusted Extractable metals factor (EBC test method)
[5]Consumption-adjusted beer soluble iron (ASBC test method)

Methods of Preparing the High Purity, Ultra-High Performance Diatomite Products/Media of the Present Invention The examples of the high purity, ultra-high performance products/media of the present invention were prepared using the ultra-high performance (not acid washed) product/media as the starting feed material. A slurry of the feed material was prepared and leached in a glass reactor using sulfuric acid under the process conditions shown in Table 22 below.

TABLE 22

Process conditions for pressure leaching of the (not acid washed) products to produce the high purity products/media

| Leaching time (min) | Leaching Temp. (° C.) | Leaching Pressure (kPa) | Leaching Solids (wt %) | Sulfuric Acid Conc. (M) |
|---|---|---|---|---|
| 60 | 95 | 101.3 | 12 | 0.2 |

The products/media may also be optionally leached at elevated temperatures and pressures. At the end of the leaching unit operation, the slurry was dewatered and thoroughly rinsed with deionized water using a pressure filter to ensure that the conductivity of 10 wt % slurry of the dried product/media is less than 20 μS/cm. The cake was dried and dispersed to obtain the high purity product/media for the ultra-high performance diatomite products/media.

Example 8

Exemplary High Purity, Ultra-High Performance Products/Media of the Present Invention Table 23 shows the properties of exemplary low permeability high purity, ultra-high performance products/media of the present disclosure. These exemplary products/media are characterized by non-detectable levels of beer soluble iron as determined by the ASBC test method. They also possess low consumption-adjusted extractable metals factors of 6 and less. The centrifuged wet density is very low and provides for very high silica specific volume.

TABLE 23

Properties of Exemplary High Purity, Ultra-high Performance Products/Media

|  | Example A | Example B |
|---|---|---|
| [1]Perm | 87 | 135 |
| SiO$_2$ (wt %) | 89.89 | 89.65 |
| Al$_2$O$_3$ (wt %) | 4.84 | 4.76 |
| Fe$_2$O$_3$ (wt %) | 3.80 | 3.69 |
| Na$_2$O (wt %) | 0.25 | 0.24 |
| [2]CWD (g/ml) | 0.188 | 0.184 |
| CWD (lb/ft$^3$) | 11.7 | 11.5 |
| [3]SSV | 4.8 | 4.9 |
| EMF[5] (ppm) | 11 | 10 |
| CA-EMF[6] (ppm) | 6 | 5 |
| BSFe (ppm) | nd[6] | nd |
| Color [L*, b*] | [74.0, 18.1] | [74.2, 18.3] |

[1]Permeability of Product - millidarcies
[2]Centrifuged Wet Density (CWD)
[3]Silica Specific Volume (SSV)
[4]Extractable Metals Factor (EBC test method)
[5]Consumption-adjusted Extractable Metals Factor (EBC test method)
[6]"nd": non-detectable

Example 9

Exemplary High Purity, Ultra-High Performance Products/Media of the Present Invention

The properties of the exemplary high purity, ultra-high performance products/media are shown in Table 24. These exemplary products/media with permeabilities in the range of about 240 millidarcies and 350 millidarcies possess very low centrifuged wet density and exceptionally high silica specific volumes relative to the prior art. They also have extremely low consumption-adjusted extractable metals factors as well as non-detectable beer soluble iron.

TABLE 24

Properties of Exemplary High Purity, Ultra-high Performance Products/Media

|  | Example A | Example B |
|---|---|---|
| [1]Perm | 242 | 346 |
| SiO$_2$ (wt %) | 89.12 | 89.20 |
| Al$_2$O$_3$ (wt %) | 4.41 | 4.39 |
| Fe$_2$O$_3$ (wt %) | 4.06 | 4.02 |
| Na$_2$O (wt %) | 0.5 | 0.6 |
| [2]CWD (g/ml) | 0.188 | 0.184 |
| CWD (lb/ft$^3$) | 11.7 | 11.5 |
| [3]SSV | 4.7 | 4.8 |
| [4]EMF (ppm) | 6 | 8 |
| [5]CA-EMF (ppm) | 3 | 4 |
| BSFe (ppm) | nd[6] | nd |
| Color [L*, b*] | [75.1, 17.3] | [75.2, 17.0] |

[1]Permeability of Product - millidarcies
[2]Centrifuged Wet Density (CWD)
[3]Silica Specific Volume (SSV)
[4]Extractable Metals Factor (EBC test method)
[5]Consumption-adjusted Extractable Metals Factor (EBC test method)
[6]"nd": non-detectable

Example 10

Exemplary High Purity, Ultra-High Performance Products/Media of the Present Invention

The characteristics of exemplary high purity, ultra-high performance products/media in the permeability range of 975 millidarcies and 1201 millidarcies are shown in Table 25 below. These exemplary products/media show very low extractable metals with the resulting extremely low consumption-adjusted extractable metals factor and non-detectable beer soluble iron. The exemplary products/media also possess high silica specific volumes. They also possess what would be regarded as poor bulk chemistries, particularly for alumina and iron oxide content, in the prior art.

TABLE 25

Properties of Exemplary High Purity, Ultra-high Performance Products/Media

|  | Example A | Example B |
|---|---|---|
| [1]Perm | 975 | 1201 |
| SiO$_2$ (wt %) | 88.70 | 89.05 |
| Al$_2$O$_3$ (wt %) | 4.05 | 3.99 |
| Fe$_2$O$_3$ (wt %) | 3.77 | 3.67 |
| Na$_2$O (wt %) | 0.8 | 1.3 |
| [2]CWD (g/ml) | 0.178 | 0.183 |
| CWD (lb/ft$^3$) | 11.1 | 11.4 |
| [3]SSV | 5.0 | 4.9 |
| [4]EMF (ppm) | 8 | 9 |
| [5]CA-EMF (ppm) | 4 | 5 |
| BSFe (ppm) | nd[6] | nd |
| Color [L*, b*] | [75.5, 17.1] | [75.6, 17.1] |

[1]Permeability of Product - millidarcies
[2]Centrifuged Wet Density (CWD)
[3]Silica Specific Volume (SSV)
[4]Extractable Metals Factor (EBC test method)
[5]Consumption-adjusted Extractable Metals Factor (EBC test method)
[6]"nd": non-detectable

Example 11

Exemplary High Purity, Ultra-High Performance Products/Media of the Present Invention

The exemplary products/media with permeabilities of 3245 millidarcies and 3998 millidarcies, respectively, have attractive properties similar to exemplary products in the other permeability ranges and are also superior in a number of respects to products of the prior art.

TABLE 26

Properties of Exemplary High Purity, Ultra-high Performance Products/Media

|  | Example A | Example B |
|---|---|---|
| [1]Perm | 3245 | 3998 |
| SiO$_2$ (wt %) | 89.38 | 89.17 |
| Al$_2$O$_3$ (wt %) | 3.88 | 3.95 |
| Fe$_2$O$_3$ (wt %) | 3.94 | 3.99 |
| Na$_2$O (wt %) | 2.0 | 3.1 |
| [2]CWD (g/ml) | 0.180 | 0.180 |
| CWD (lb/ft$^3$) | 11.2 | 11.2 |
| [3]SSV | 5.0 | 5.0 |
| [4]EMF (ppm) | 7 | 9 |
| [5]CA-EMF (ppm) | 4 | 5 |
| BSFe (ppm) | nd[6] | nd |
| Color [L*, b*] | [75.8, 17.1] | [75.8, 16.8] |

[1]Permeability of Product - millidarcies
[2]Centrifuged Wet Density (CWD)
[3]Silica Specific Volume (SSV)
[4]Extractable Metals Factor (EBC test method)
[5]Consumption-adjusted Extractable Metals Factor (EBC test method)
[6]"nd": non-detectable

Example 12

The exemplary high purity, ultra-high performance products/media with permeabilities ranging from about 4104 millidarcies to about 12,179 millidarcies are shown in Tables 27, 28 and 29.

TABLE 27

Properties of Exemplary High Purity, Ultra-high Performance Products/Media

|  | Example A | Example B |
|---|---|---|
| [1]Perm | 4104 | 5217 |
| $SiO_2$ (wt %) | 87.19 | 87.51 |
| $Al_2O_3$ (wt %) | 4.16 | 4.04 |
| $Fe_2O_3$ (wt %) | 3.96 | 3.91 |
| $Na_2O$ (wt %) | 3.1 | 3.5 |
| [2]CWD (g/ml) | 0.173 | 0.173 |
| CWD (lb/ft³) | 10.8 | 10.8 |
| [3]SSV | 5.0 | 5.1 |
| [4]EMF (ppm) | 8 | 9 |
| [5]CA-EMF (ppm) | 4 | 5 |
| BSFe (ppm) | nd[6] | nd |
| Color [L*, b*] | [76.2, 16.5] | [76.0, 16.6] |

[1]Permeability of Product - millidarcies
[2]Centrifuged Wet Density (CWD)
[3]Silica Specific Volume (SSV)
[4]Extractable Metals Factor (EBC test method)
[5]Consumption-adjusted Extractable Metals Factor (EBC test method)
[6]"nd": non-detectable

Example 13

Exemplary High Purity, Ultra-High Performance Products/Media

TABLE 28

Properties of Exemplary High Purity, Ultra-high Performance Products/Media

|  | Example A | Example B |
|---|---|---|
| [1]Perm | 6834 | 8051 |
| $SiO_2$ (wt %) | 85.45 | 85.65 |
| $Al_2O_3$ (wt %) | 4.63 | 4.64 |
| $Fe_2O_3$ (wt %) | 4.21 | 4.25 |
| $Na_2O$ (wt %) | 3.7 | 4.1 |
| [2]CWD (g/ml) | 0.168 | 0.171 |
| CWD (lb/ft³) | 10.5 | 10.7 |
| [3]SSV | 5.1 | 5.0 |
| [4]EMF (ppm) | 10 | 11 |
| [5]CA-EMF (ppm) | 5 | 6 |
| BSFe (ppm) | nd[6] | nd |
| Color [L*, b*] | [76.6, 14.1] | [76.2, 14.3] |

[1]Permeability of Product - millidarcies
[2]Centrifuged Wet Density (CWD)
[3]Silica Specific Volume (SSV)
[4]Extractable Metals Factor (EBC test method)
[5]Consumption-adjusted Extractable Metals Factor (EBC test method)
[6]"nd": non-detectable

Example 14

TABLE 29

Properties of Exemplary High Purity, Ultra-high Performance Products/Media

|  | Example A | Example B |
|---|---|---|
| [1]Perm | 10,115 | 12,179 |
| $SiO_2$ (wt %) | 85.25 | 84.97 |
| $Al_2O_3$ (wt %) | 4.43 | 4.51 |
| $Fe_2O_3$ (wt %) | 4.15 | 4.21 |
| $Na_2O$ (wt %) | 4.34 | 4.35 |
| [2]CWD (g/ml) | 0.173 | 0.176 |
| CWD (lb/ft³) | 10.8 | 11.0 |
| [3]SSV | 4.9 | 4.8 |
| [4]EMF (ppm) | 11 | 10 |
| [5]CA-EMF (ppm) | 6 | 5 |
| BSFe (ppm) | nd[6] | nd |
| Color [L*, b*] | [76.9, 14.1] | [76.2, 14.3] |

[1]Permeability of Product - millidarcies
[2]Centrifuged Wet Density (CWD)
[3]Silica Specific Volume (SSV)
[4]Extractable Metals Factor (EBC test method)
[5]Consumption-adjusted Extractable Metals Factor (EBC test method)
[6]"nd": non-detectable

REFERENCES

The disclosures of the publications, patents and published patent specifications referenced below are hereby incorporated by reference into the present disclosure in their entirety to more fully describe the state of the art of which this invention pertains.

Analitika—EBC, 4 Aug. 1987 issue, page D 257, 11.8. Filtrationsleistung.
Bregar, G. W., (1951) U.S. Pat. No. 2,701,240.
Bradley, T. G., et al. (1979), U.S. Pat. No. 4,134,857.
Showa Chemical Industry Co., Ltd, Publication 95.1.200(3), 1995.
Nielsen, R. B. et al. (1979), U.S. Pat. No. 4,142,968.
Austin, F. J., et al, (1990), U.S. Pat. No. 4,965,084.
Shiuh, J. C., et al. (1997), U.S. Pat. No. 5,656,568.
Shiuh, J. C., et al. (2003), U.S. Pat. No. 6,653,255.
Ting, P. L., et al. (2011). US Publication No. 2011/0223301.
Wang et al., (2008), International Patent Application No. 2007/076723,
Antonides, L. E. (1997). Diatomite.
Woods, P. (2011) Diatoms of the United States.
Kouloheris, A. P., U.S. Pat. No. 3,572,500.
Enrico et al., (1948) Diatomaceous Earth Silicosis.
Sulpizio, T. E. (1999), Advances in Filter Aid and Precoat Filtration Technology.
Technical Note AMC02, version 3.5, *Comparing Conventional Diatomite and Celpure Filter Aids*, (2002).
Methods of Analysis of the American Society of Brewing Chemist, 1987.
Breese R. O. Y. et al. (2006), Industrial Minerals and Rocks—Commodities, Markets and Uses, 7th edition, Diatomite, Pg. 442.
El-Shafey, E. L., et al. (2004), J. de Cravalho, Sep. Sci. Technol. 39, pg. 3237.
Mahani, H. et al. (2003), *Treatment of Diatomaceous Earth to Obtain its Catalyst Support*, Scientia Iranica, vol. 10, No. 3, Pg. 350-356.
Mikulasik, et al., U.S. Pat. No. 8,883,860.
Rees, R. H., et al, 1990, "Let Diatomite Enhance Your Filtration," Chemical Engineering, Vol. 97, No. 8, August, pp. 72-74.

Cain, C. W., 1984, "Filter Aid Use in Filtration," Encyclopedia of Chemical Processing and Design New York, Marcel Dekker, pp. 348-372.

Santa Barbara County APCD, draft permit to operate No. 5840—R5 Part II, November 2015. Nyamekye, G. A. et al, U.S. Pat. No. 8,410,017.

Riede, R. G., 1961, U.S. Pat. No. 3,013,981.

Fennell, J. E., 1954, U.S. Pat. No. 2,693,456.

Lenz, P. E., et al., International Patent No. PCT/US16/37816.

Taniguchi, J. D., International Patent No. PCT/US2014/067873.

What is claimed is:

1. A filtration product comprising a diatomaceous earth that includes a diatom frustule population,
   wherein the diatomaceous earth has an intricate and a porous structure of a diatomite and a silica specific volume from 3.5 to 6.2,
   wherein the diatomaceous earth has a b* value from 13 to 20 wherein the b* value represents a value showing color variation between a negative blue value and a positive yellow value,
   wherein the diatomaceous earth is from an ore that is sourced from a lacustrine diatomite deposit,
   wherein the diatom frustule population contains a plurality of diatom frustules derived from diatoms of a species *Cymbella designate*, and
   wherein the diatom frustule population contains at least 70% of diatom frustules which are derived from diatoms of a genus *Cymbella*.

2. The filtration product of claim 1, wherein the diatomaceous earth further has an extractable metals factor from 6 to 14 ppm.

3. The filtration product of claim 1, wherein the diatomaceous earth further has a consumption-adjusted extractable metals factor from 4 to 8 ppm, wherein the silica specific volume is from 3.9 to 5.1.

4. The filtration product of claim 1, wherein the silica specific volume of the diatomaceous earth is from 3.9 to 6.2.

5. The filtration product of claim 1, wherein the diatomaceous earth further has a ratio of a European Brewery Convention (EBC) extractable aluminum to a bulk aluminum oxide content from 0.4 to 1.0, wherein the EBC extractable aluminum is measured in parts per million and the bulk aluminum oxide is measured by weight percent.

6. The filtration product of claim 1, wherein the diatomaceous earth further has a permeability from about 200 millidarcy to 14,000 millidarcy and contains non-detectable levels of a cristobalite when determined using the LH Method.

7. The filtration product of claim 1, wherein the diatomaceous earth comprises: (i) a permeability from 85 millidarcy to 14,000 millidarcy; and (ii) an aluminum oxide content and an iron oxide content, wherein a sum of the aluminum oxide content and the iron oxide content is from 7.0 wt % to 13 wt %.

8. The filtration product of claim 1, wherein the diatomaceous earth further has a non-detectable level of a cristobalite according to the LH Method.

9. The filtration product of claim 1, wherein the diatomaceous earth further has a silica content from 80 wt % to 84 wt % on an ignited basis.

10. The filtration product of claim 1, wherein the diatomaceous earth further has a silica content from 84 wt % to 87 wt % on an ignited basis.

11. The filtration product of claim 1, wherein the diatomaceous earth further has a silica content from 88 wt % to 92 wt % on an ignited basis.

12. The filtration product of claim 7, wherein the iron oxide content is greater than 4 wt % on an ignited basis.

13. The filtration product of claim 1, wherein the diatomaceous earth comprises a ratio of a European Brewery Convention (EBC) extractable iron to a bulk iron oxide content from 0.4 to 1.1, wherein the EBC extractable iron is measured in parts per million and the bulk iron oxide is measured by weight percent.

14. The filtration product of claim 1, wherein the diatomaceous earth further has a centrifuged wet density from 0.168 g/ml to 0.183 g/ml.

15. The filtration product of claim 1, wherein the diatomaceous earth further has a centrifuged wet density from 0.184 g/ml to 0.197 g/ml.

16. The filtration product of claim 1, wherein the diatomaceous earth further has a centrifuged wet density from 0.198 g/ml to 0.208 g/ml.

* * * * *

UNITED STATES PATENT AND TRADEMARK OFFICE
CERTIFICATE OF CORRECTION

PATENT NO. : 11,633,713 B2
APPLICATION NO. : 16/476215
DATED : April 25, 2023
INVENTOR(S) : Scott K. Palm et al.

It is certified that error appears in the above-identified patent and that said Letters Patent is hereby corrected as shown below:

On the Title Page

Column 1, Item (54), Title, Line 2, delete "PURIFY" and insert -- PURITY --

In the Specification

Column 1, Line 2, delete "PURIFY" and insert -- PURITY --

Signed and Sealed this
Twentieth Day of June, 2023

Katherine Kelly Vidal
*Director of the United States Patent and Trademark Office*